US012749450B2

(12) United States Patent
Lee et al.

(10) Patent No.: US 12,749,450 B2
(45) Date of Patent: Sep. 29, 2026

(54) SCAN DRIVER AND DISPLAY DEVICE INCLUDING THE SAME

(71) Applicant: Samsung Display Co., LTD., Yongin-si (KR)

(72) Inventors: Wonjun Lee, Yongin-si (KR); Kyung-Hoon Kim, Yongin-si (KR); Kyonghwan Oh, Yongin-si (KR); Dongwoo Kim, Yongin-si (KR); Sehyun Lee, Yongin-si (KR); Jinjoo Ha, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/826,486

(22) Filed: Sep. 6, 2024

(65) Prior Publication Data

US 2025/0087169 A1 Mar. 13, 2025

(30) Foreign Application Priority Data

Sep. 12, 2023 (KR) ........................ 10-2023-0121097

(51) Int. Cl.
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2300/0426* (2013.01); *G09G 2300/0819* (2013.01); *G09G 2300/0842* (2013.01); *G09G 2300/0861* (2013.01); *G09G 2310/0286* (2013.01); *G09G 2310/08* (2013.01)

(58) Field of Classification Search
CPC ............... G09G 3/3266; G09G 3/3233; G09G 2300/0426; G09G 2300/0819; G09G 2300/0842; G09G 2300/0861; G09G 2310/0286; G09G 2310/08
See application file for complete search history.

(56) References Cited

U.S. PATENT DOCUMENTS 7,696,974 B2 4/2010 Moon et al.
9,305,509 B2 4/2016 Li et al.
10,580,361 B2 3/2020 Zhu et al.
10,783,832 B2 9/2020 Shin et al.
10,909,929 B2 2/2021 Yang et al.
(Continued)

FOREIGN PATENT DOCUMENTS

KR 1020180081196 A 7/2018
KR 1020190139356 A 12/2019
(Continued)

*Primary Examiner* — Dennis P Joseph
(74) *Attorney, Agent, or Firm* — CANTOR COLBURN LLP

(57) ABSTRACT

A scan driver includes a plurality of stages sequentially connected to each other. Each of the plurality of stages includes first and second output transistors and first to fourth control transistors. The second control transistor is connected between a second node and a first voltage terminal and to an input terminal and operates in response to a start signal or a previous carry signal provided through the input terminal. Each of the first and second output transistors and the first, third, and fourth control transistors is a first type, and the second control transistor is a second type different from the first type.

10 Claims, 23 Drawing Sheets

(56) References Cited

U.S. PATENT DOCUMENTS

| | | | | |
|---|---|---|---|---|
| 10,937,371 | B2 | 3/2021 | Chung et al. | |
| 11,328,642 | B2 | 5/2022 | Shang et al. | |
| 11,514,840 | B2 | 11/2022 | Jang | |
| 11,676,528 | B2 | 6/2023 | Kim et al. | |
| 2019/0378458 | A1 | 12/2019 | Lee et al. | |
| 2021/0183312 | A1 | 6/2021 | Kim et al. | |
| 2022/0093028 | A1* | 3/2022 | Hong | G11C 19/28 |
| 2022/0230591 | A1 | 7/2022 | Na | |
| 2023/0024029 | A1 | 1/2023 | Yu et al. | |
| 2024/0420644 | A1* | 12/2024 | Gui | G09G 3/3266 |

FOREIGN PATENT DOCUMENTS

| | | | |
|---|---|---|---|
| KR | 1020220090924 | A | 6/2022 |
| KR | 1020230101466 | A | 7/2023 |

* cited by examiner

SCAN DRIVER AND DISPLAY DEVICE INCLUDING THE SAME

This application claims priority to Korean Patent Application No. 10-2023-0121097, filed on Sep. 12, 2023, and all the benefits accruing therefrom under 35 U.S.C. § 119, the content of which in its entirety is herein incorporated by reference.

BACKGROUND

1. Field

Embodiments of the disclosure described herein relate to a scan driver and a display device including the same, and more particularly, relate to a scan driver with a simplified circuit structure and a display device including the same.

2. Description of the Related Art

A light-emitting display device among display devices displays an image by a light-emitting diode that generates a light through the recombination of electrons and holes. The light-emitting display device consumes less power and supports a faster response speed compared to those of other display devices.

The light-emitting display device includes a display panel in which pixels are disposed in a valid area. Each of the pixels generally includes a light-emitting diode and a pixel circuit unit for controlling an amount of current flowing to the light-emitting diode. The pixel circuit unit is connected to a data line receiving a data signal and a scan line receiving a scan signal. In response to the data signal, the pixel circuit unit controls the amount of current that flows from a first driving voltage to a second driving voltage through the light-emitting diode. In this case, there is generated a light of luminance corresponding to the amount of current flowing through the light-emitting diode.

SUMMARY

Embodiments of the disclosure provide a scan driver capable of simplifying a circuit structure and reducing power consumption and a display device including the same.

In an embodiment of the disclosure, a scan driver includes a plurality of stages sequentially connected to each other. Each of the plurality of stages includes a first output transistor that is connected between an output terminal and a first voltage terminal and operates in response to a potential of a first node, a second output transistor that is connected between the output terminal and a second voltage terminal and operates in response to a potential of a second node, a first control transistor that is connected between an input terminal receiving a start signal or a previous carry signal from a previous stage and a third node and operates in response to a clock signal provided through a clock terminal, a second control transistor that is connected between the second node and the first voltage terminal and operates in response to the start signal or the previous carry signal provided through the input terminal or operates in response to a potential of the third node, a third control transistor that is connected between the third node and the first node and operates in response to a first voltage provided through the first voltage terminal, and a fourth control transistor that is connected between the second node and the second voltage terminal and operates in response to the potential of the third node. Each of the first and second output transistors and the first, third, and fourth control transistors is a first type, and the second control transistor is a second type different from the first type.

In an embodiment of the disclosure, a scan driver includes a plurality of stages sequentially connected to each other. Each of the plurality of stages includes a first output transistor that includes a first electrode connected to an output terminal, a second electrode connected to a first voltage terminal, and a third electrode connected to a first node, a first capacitor that is connected between the output terminal and the first node, a second output transistor that includes a first electrode connected to the output terminal, a second electrode connected to a second voltage terminal, and a third electrode connected to a second node, a first control transistor that includes a first electrode connected to an input terminal, a second electrode connected to a third node, and a third electrode connected to a clock terminal, a second control transistor that includes a first electrode connected to the second node, a second electrode connected to the first voltage terminal, a third electrode connected to the input terminal or the third node, and a bottom gate electrode facing the third electrode, a third control transistor that includes a first electrode connected to the third node, a second electrode connected to the first node, and a third electrode connected to the first voltage terminal, and a fourth control transistor that includes a first electrode connected to the second node, a second electrode connected to the second voltage terminal, and a third electrode connected to the third node.

In an embodiment of the disclosure, a display device includes a display panel that includes a plurality of pixels, a data driver that outputs data signals to the display panel, and a scan driver which outputs scan signals to the display panel. The scan driver includes a plurality of stages sequentially connected to each other, and each of the plurality of stages includes a first output transistor that includes a first electrode connected to an output terminal, a second electrode connected to a first voltage terminal, and a third electrode connected to a first node, a second output transistor that includes a first electrode connected to the output terminal, a second electrode connected to a second voltage terminal, and a third electrode connected to a second node, a first control transistor that includes a first electrode connected to an input terminal, a second electrode connected to a third node, and a third electrode connected to a clock terminal, a second control transistor that includes a first electrode connected to the second node, a second electrode connected to the first voltage terminal, a third electrode connected to the input terminal or the third node, a third control transistor that includes a first electrode connected to the third node, a second electrode connected to the first node, and a third electrode connected to the first voltage terminal, and a fourth control transistor that includes a first electrode connected to the second node, a second electrode connected to the second voltage terminal, and a third electrode connected to the third node. Each of the first and second output transistors and the first, third, and fourth control transistors is a P-type, and the second control transistor is an N-type.

BRIEF DESCRIPTION OF THE DRAWINGS

The above and other embodiments, advantages and features of the disclosure will become apparent by describing in detail embodiments thereof with reference to the accompanying drawings.

DETAILED DESCRIPTION

Figure 1:
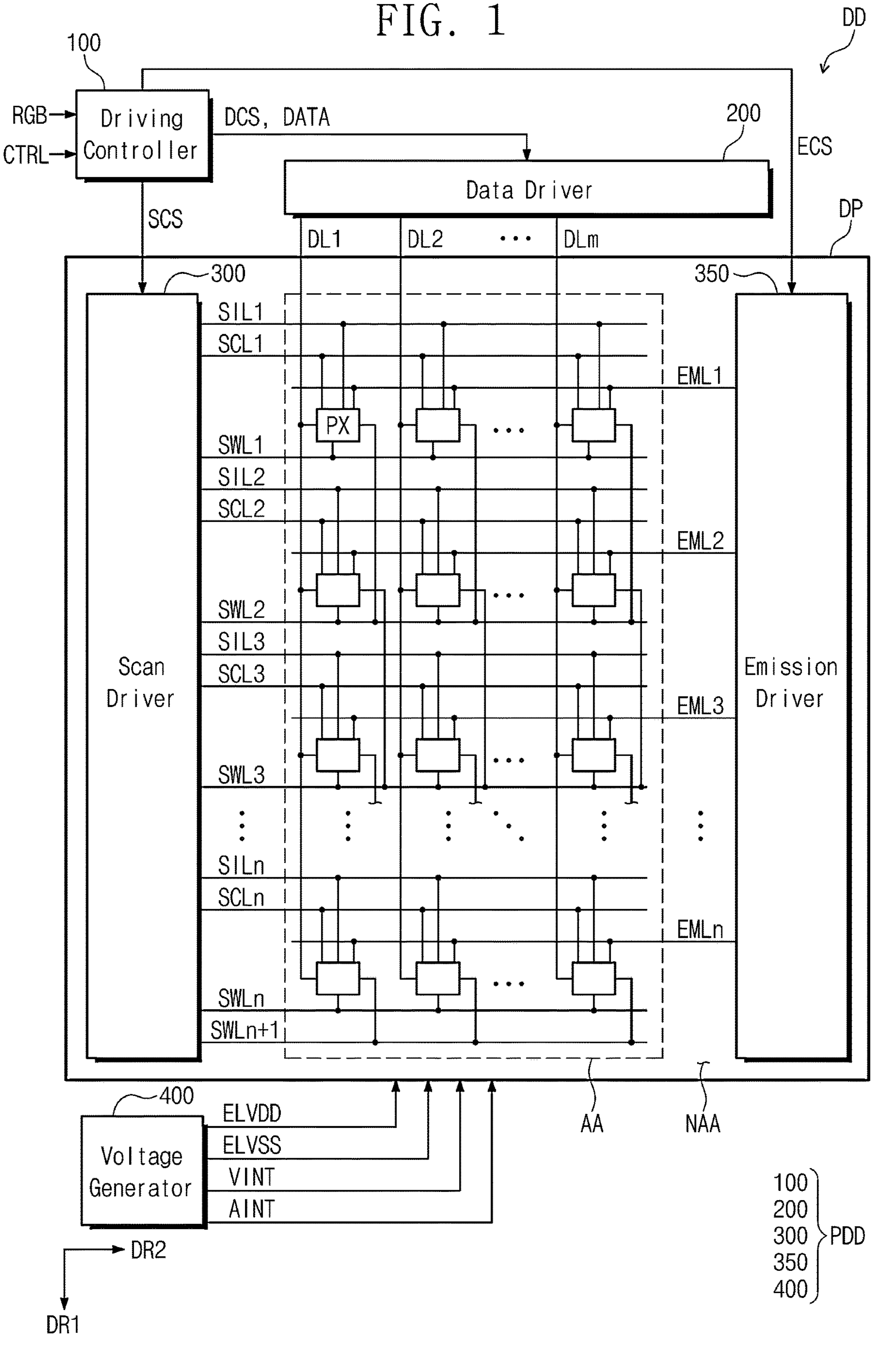
FIG. 1 is a block diagram of an embodiment of a display device according to the disclosure.

In the specification, the expression that a first component (or an area, a layer, a part, or a portion) is "on", "connected to", or "coupled to" a second component means that the first component is directly on/connected to/coupled to the second component or means that a third component is interposed therebetween.

The same reference numerals refer to the same components. Also, in drawings, the thickness, ratio, and dimension of components are exaggerated for effectiveness of description of technical contents. The term "and/or" includes one or more combinations in each of which associated elements are defined.

Although the terms "first", "second", etc., may be used to describe various components, the components should not be construed as being limited by the terms. The terms are only used to distinguish one component from another component. For example, without departing from the scope and spirit of the invention, a first component may be referred to as a "second component", and similarly, the second component may be referred to as the "first component". The articles "a", "an", and "the" are singular in that they have a single referent, but the use of the singular form in the specification should not preclude the presence of more than one referent.

Also, the terms "under", "below", "on", "above", etc., are used to describe the correlation of components illustrated in drawings. The terms are relative and are described with respect to a direction indicated in the drawing.

It will be further understood that the terms "comprises", "includes", "have", etc., specify the presence of stated features, numbers, steps, operations, elements, components, or a combination thereof but do not preclude the presence or addition of one or more other features, numbers, steps, operations, elements, components, or a combination thereof.

Unless otherwise defined, all terms (including technical terms and scientific terms) used in the specification have the same meaning as commonly understood by one skilled in the art to which the disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Below, embodiments of the disclosure will be described with reference to drawings.

FIG. 1 is a block diagram of an embodiment of a display device according to the disclosure.

Referring to FIG. 1, a display device DD includes a display panel DP and a panel driver PDD for driving the display panel DP. In an embodiment of the disclosure, the panel driver PDD includes a driving controller 100, a data driver 200, a scan driver 300, an emission driver 350, and a voltage generator 400.

The driving controller 100 receives an input image signal RGB and a control signal CTRL from a host processor. In an embodiment of the disclosure, the host processor may be a graphic processing unit ("GPU"). The driving controller 100 generates image data DATA by converting a data format of the input image signal RGB in compliance with the specification for an interface with the data driver 200. The control signal CTRL may include at least one of a vertical synchronization signal, an input data enable signal, a master clock signal, etc. The driving controller 100 generates a first driving control signal SCS, a second driving control signal DCS, and a third driving control signal ECS based on the control signal CTRL.

The data driver 200 receives the second driving control signal DCS and the image data DATA from the driving controller 100. The data driver 200 converts the image data DATA to data signals and outputs the data signals to a plurality of data lines DL1 to DLm to be described later. The data signals refer to analog voltages corresponding to grayscale values of the image data DATA. Herein, "m" is an integer number of 1 or more.

The scan driver 300 receives the first driving control signal SCS from the driving controller 100. The scan driver 300 may output scan signals to scan lines in response to the first driving control signal SCS.

The voltage generator 400 generates voltages desired for an operation of the display panel DP. In an embodiment, the voltage generator 400 generates a first driving voltage ELVDD, a second driving voltage ELVSS, a first initialization voltage VINT, and a second initialization voltage AINT.

The display panel DP further includes initialization scan lines SIL1 to SILn, compensation scan lines SCL1 to SCLn, write scan lines SWL1 to SWLn+1, emission control lines EML1 to EMLn, and the data lines DL1 to DLm. Herein, "n" is an integer number of 1 or more. The initialization scan lines SIL1 to SILn, the compensation scan lines SCL1 to SCLn, the write scan lines SWL1 to SWLn+1, the emission control lines EML1 to EMLn, the data lines DL1 to DLm, and the pixels PX may overlap an effective area AA. The initialization scan lines SIL1 to SILn, the compensation scan lines SCL1 to SCLn, the write scan lines SWL1 to SWLn+1, and the emission control lines EML1 to EMLn extend in a second direction DR2. The initialization scan lines SIL1 to SILn, the compensation scan lines SCL1 to SCLn, the write scan lines SWL1 to SWLn+1, and the emission control lines EML1 to EMLn are spaced from each other in a first direction DR1. The data lines DL1 to DLm extend in the first direction DR1 and are spaced from each other in the second direction DR2.

The plurality of pixels PX is electrically connected to the initialization scan lines SIL1 to SILn, the compensation scan lines SCL1 to SCLn, the write scan lines SWL1 to SWLn+1, the emission control lines EML1 to EMLn, and the data lines DL1 to DLm. Each of the plurality of pixels PX may be electrically connected to four scan lines. In an embodiment, the pixels PX belonging to the first row may be connected to the first initialization scan line SIL1, the first compensation scan line SCL1, and the first and second write scan lines SWL1 and SWL2, for example. Also, the pixels PX belonging to the second row may be connected to the second initialization scan line SIL2, the second compensation scan line SCL2, and the second and third write scan lines SWL2 and SWL3. However, the number of scan lines connected to each pixel PX is not limited thereto, and may be variously changed or modified. In an alternative embodiment, each of the plurality of pixels PX may be electrically connected to five scan lines, and in this case, the display panel DP may further include black scan lines.

The scan driver 300 may be disposed in a non-effective area NAA of the display panel DP. The scan driver 300 receives the first driving control signal SCS from the driving controller 100. In response to the first driving control signal SCS, the scan driver 300 may output initialization scan signals to the initialization scan lines SIL1 to SILn, may output compensation scan signals to the compensation scan lines SCL1 to SCLn, and may output write scan signals to the write scan lines SWL1 to SWLn+1. A circuit configuration and an operation of the scan driver 300 will be described in detail later.

The emission driver 350 receives the third driving control signal ECS from the driving controller 100. The emission driver 350 may output emission control signals to the emission control lines EML1 to EMLn in response to the third driving control signal ECS. In another embodiment, the scan driver 300 may be connected to the emission control lines EML1 to EMLn. In this case, the scan driver 300 may output the emission control signals to the emission control lines EML1 to EMLn.

Each of the plurality of pixels PX includes a light-emitting element ED (refer to FIG. 2) and a pixel circuit unit PXC (refer to FIG. 2) controlling the emission of the light-emitting element ED. The pixel circuit unit PXC may include a plurality of transistors and a capacitor. The scan driver 300 and the emission driver 350 may include transistors formed through the same process as the pixel circuit unit PXC.

Each of the plurality of pixels PX receives the first driving voltage ELVDD, the second driving voltage ELVSS, the first initialization voltage VINT, and the second initialization voltage AINT from the voltage generator 400.

Figure 2:
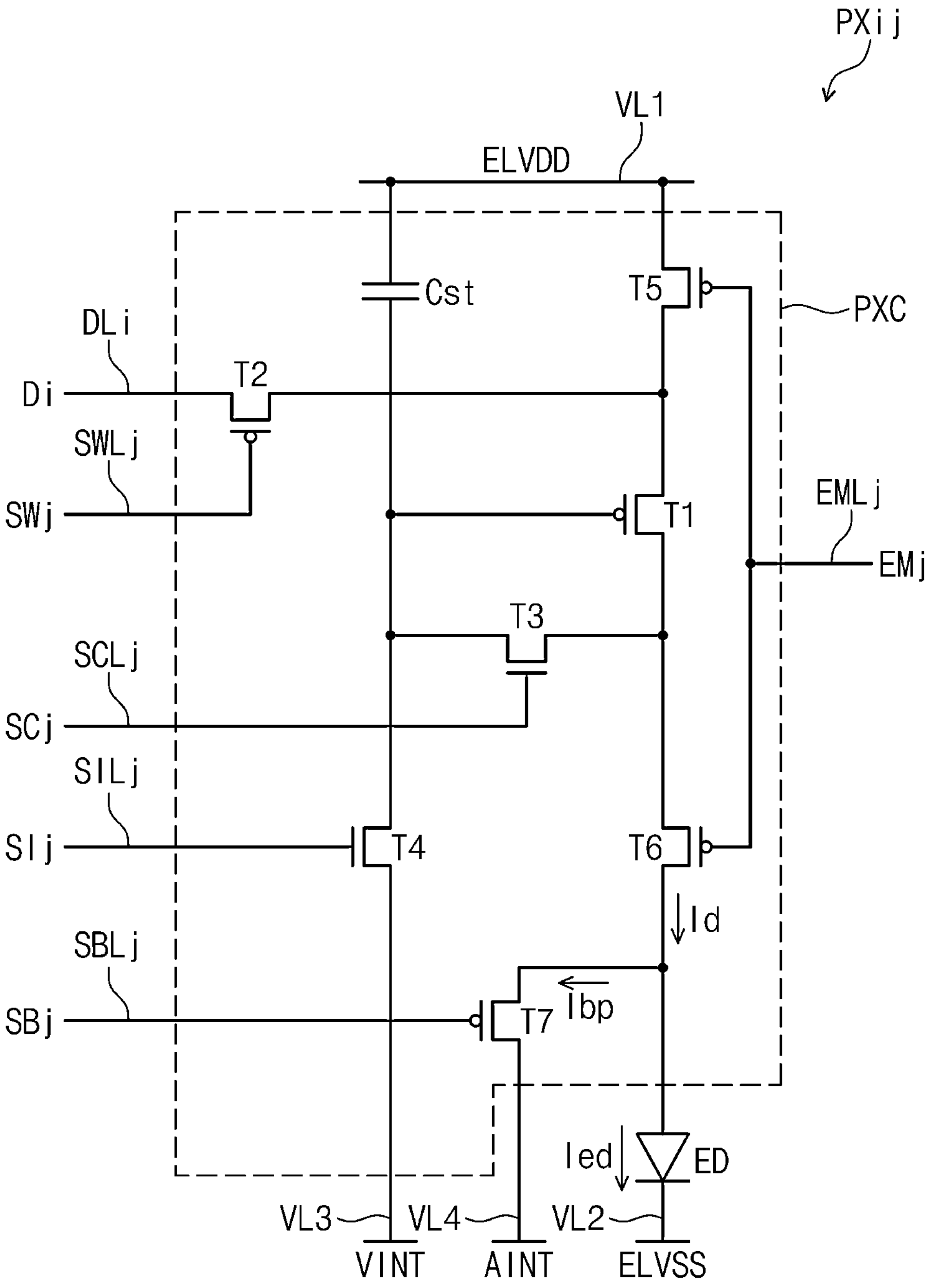
FIG. 2 is a circuit diagram of an embodiment of a pixel according to the disclosure.
Figure 3:
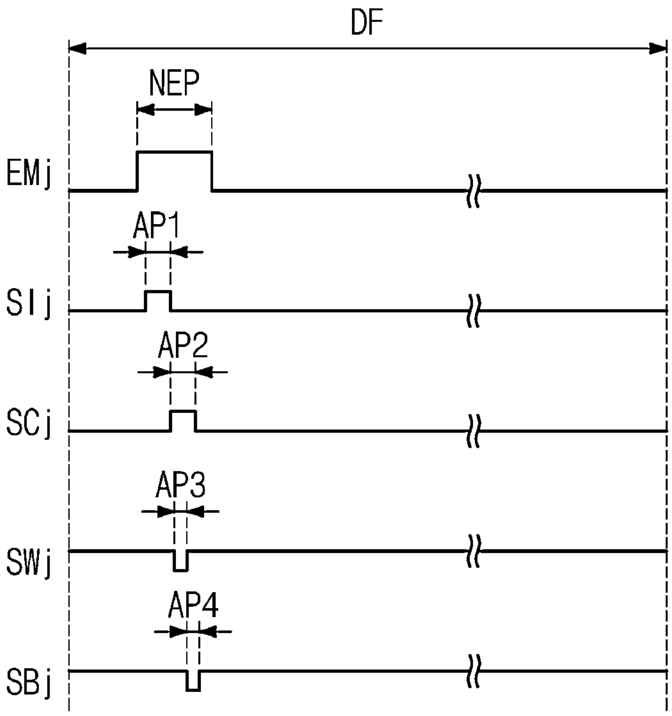
FIG. 3 is a timing diagram of an embodiment of a pixel according to the disclosure.

FIG. 2 is a circuit diagram of an embodiment of a pixel according to the disclosure, and FIG. 3 is a timing diagram of an embodiment of a pixel according to the disclosure.

An equivalent circuit diagram of one pixel PXij among the plurality of pixels PX illustrated in FIG. 1 is illustrated in FIG. 2 as one of embodiments. The plurality of pixels PX has the same structure, and thus, additional description associated with the remaining pixels PX other than the pixel PXij will be omitted to avoid redundancy.

Referring to FIG. 2, the pixel PXij is connected to the i-th data line (hereinafter also referred to as a "data line") DLi among the data lines DL1 to DLm and the j-th emission control line (hereinafter also referred to as an "emission control line") EMLj among the emission control lines EML1 to EMLn. Herein, "i" is an integer of 1 or more and m or less, and "j" is an integer of 1 or more and n or less. The pixel PXij is connected to the j-th initialization scan line (hereinafter also referred to as an "initialization scan line") SILj among the initialization scan lines SIL1 to SILn, the j-th write scan line (hereinafter also referred to as a "write scan line") SWLj among the write scan lines SWL1 to SWLn+1, and a j-th black scan line (hereinafter also referred to as a "black scan line") SBLj. Also, the pixel PXij is connected to the j-th compensation scan line (hereinafter also referred to as a "compensation scan line") SCLj among the compensation scan lines SCL1 to SCLn. In an alternative embodiment, the pixel PXij may be connected to the (j+1)-th write scan line instead of the j-th black scan line SBLj.

The pixel PXij includes the light-emitting element ED and the pixel circuit unit PXC. The light-emitting element ED may be a light-emitting diode. The light-emitting diode may include at least one of an organic light-emitting material, an inorganic light-emitting material, a quantum dot, a quantum rod, etc., as an emission layer.

The pixel circuit unit PXC includes first to seventh transistors T1, T2, T3, T4, T5, T6, and T7 and a single capacitor Cst. Each of the first to seventh transistors T1 to T7 may be a transistor including a low-temperature polycrystalline silicon ("LTPS") semiconductor layer. Some transistors of the first to seventh transistors T1 to T7 may be P-type transistors, and remaining transistors thereof may be N-type transistors. In an embodiment, among the first to seventh transistors T1 to T7, the first, second, and fifth to seventh transistors T1, T2, and T5 to T7 may be P-type transistors, and the third and fourth transistors T3 and T4 may be N-type transistors by an oxide semiconductor as a semiconductor layer, for example. However, a configuration of the pixel circuit unit PXC according to the disclosure is not limited to the embodiment illustrated in FIG. 2. The pixel circuit unit PXC illustrated in FIG. 2 is only one of embodiments, and the configuration of the pixel circuit unit PXC may be modified and implemented. In an embodiment, all of the first to seventh transistors T1 to T7 may be P-type transistors or N-type transistors, for example.

The initialization scan line SILj, the compensation scan line SCLj, the write scan line SWLj, the black scan line SBLj, and the emission control line EMLj may respectively transfer a j-th initialization scan signal (hereinafter also referred to as an "initialization scan signal") SIj, a j-th compensation scan signal (hereinafter also referred to as a "compensation scan signal") SCj, a j-th write scan signal (hereinafter also referred to as a "write scan signal") SWj, a j-th black scan signal (hereinafter also referred to as a "black scan signal") SBj, and a j-th emission control signal (hereinafter also referred to as an "emission control signal") EMj to the pixel PXij. The data line DLi transfers a data signal Di to the pixel PXij. The data signal Di may have a voltage level corresponding to a grayscale of a relevant input image signal belonging to the input image signal RGB input to the display device DD (refer to FIG. 1). First to fourth driving voltage lines VL1, VL2, VL3, and VL4 may respectively transfer the first driving voltage ELVDD, the second driving voltage ELVSS, the first initialization voltage VINT, and the second initialization voltage AINT to the pixel PXij.

The first transistor T1 includes a first electrode connected to the first driving voltage line VL1 through the fifth transistor T5, a second electrode electrically connected to an anode of the light-emitting element ED through the sixth transistor T6, and a gate electrode connected to a first end of the capacitor Cst. The first transistor T1 may receive the data signal Di transferred through the data line DLi depending on the switching operation of the second transistor T2 and may then supply a driving current Id to the light-emitting element ED.

The second transistor T2 includes a first electrode connected to the data line DLi, a second electrode connected to the first electrode of the first transistor T1, and a gate electrode connected to the write scan line SWLj. The second transistor T2 may be turned on depending on the write scan signal SWj transferred through the write scan line SWLj and may then transfer the data signal Di from the data line DLi to the first electrode of the first transistor T1.

The third transistor T3 includes a first electrode connected to the second electrode of the first transistor T1, a second electrode connected to the gate electrode of the first transistor T1, and a gate electrode connected to the compensation scan line SCLj. The third transistor T3 may be turned on depending on the compensation scan signal SCj transferred through the compensation scan line SCLj, and thus, the gate electrode and the second electrode of the first transistor T1 may be connected to each other, that is, the first transistor T1 may be diode-connected.

The fourth transistor T4 includes a first electrode connected to the gate electrode of the first transistor T1, a second electrode connected to the third driving voltage line VL3 through which the first initialization voltage VINT is transferred, and a gate electrode connected to the initialization scan line SILj. The fourth transistor T4 may be turned on depending on the initialization scan signal SIj transferred through the initialization scan line SILj, and thus, the first initialization voltage VINT may be transferred to the gate electrode of the first transistor T1. As such, a voltage of the gate electrode of the first transistor T1 may be initialized. This operation may be also referred to as an "an initialization operation".

The fifth transistor T5 includes a first electrode connected to the first driving voltage line VL1, a second electrode connected to the first electrode of the first transistor T1, and a gate electrode connected to the emission control line EMLj.

The sixth transistor T6 includes a first electrode connected to the second electrode of the first transistor T1, a second electrode connected to the anode of the light-emitting element ED, and a gate electrode connected to the emission control line EMLj.

The fifth transistor T5 and the sixth transistor T6 are simultaneously turned on in response to the emission control signal EMj transferred through the emission control line EMLj. The first driving voltage ELVDD applied through the turned-on fifth transistor T5 may be transferred to the light-emitting element ED after compensated through the diode-connected first transistor T1.

The seventh transistor T7 includes a first electrode connected to the second electrode of the sixth transistor T6, a second electrode connected to the fourth driving voltage line VL4 through which the second initialization voltage AINT is transferred, and a gate electrode connected to the black scan line SBLj.

The first end of the capacitor Cst is connected to the gate electrode of the first transistor T1 as described above, and a second end of the capacitor Cst is connected to the first driving voltage line VL1. A cathode of the light-emitting element ED may be connected to the second driving voltage line VL2 transferring the second driving voltage ELVSS.

Referring to FIGS. 2 and 3, the display panel DP (refer to FIG. 1) may display an image during a driving frame DF.

The plurality of scan signals SIj, SCj, SWj, and SBj may be activated during the driving frame DF. In detail, the initialization scan signal SIj includes a first active period AP1 having the relatively high level within the driving frame DF, and the compensation scan signal SCj includes a second active period AP2 having the relatively high level within the driving frame DF. The write scan signal SWj includes a third active period AP3 having the relatively low level within the driving frame DF, and the black scan signal SBj includes a fourth active period AP4 having the relatively low level with the driving frame DF.

The emission control signal EMj may include a non-emission period NEP that is deactivated within the driving frame DF. In an embodiment of the disclosure, the non-emission period NEP may be a high-level period. The non-emission period NEP may overlap the first to fourth active periods AP1, AP2, AP3, and AP4.

When the initialization scan signal SIj of the relatively high level is provided to the initialization scan line SILj during the first active period AP1, the fourth transistor T4 is turned on in response to the initialization scan signal SIj of the relatively high level. The first initialization voltage VINT is transferred to the gate electrode of the first transistor T1 through the turned-on fourth transistor T4, and the gate electrode of the first transistor T1 is initialized by the first initialization voltage VINT.

Next, when the compensation scan signal SCj of the relatively high level is supplied through the compensation scan line SCLj during the second active period AP2, the third transistor T3 is turned on. During the second active period AP2, the first transistor T1 is diode-connected by the third transistor T3 turned on and is forward-biased. The second active period AP2 of the compensation scan signal SCj does not overlap the first active period AP1 of the initialization scan signal SIj. Also, the first active period AP1 of the initialization scan signal SIj may precede the second active period AP2 of the compensation scan signal SCj.

In an embodiment of the disclosure, the second active period AP2 of the compensation scan signal SCj is defined as a period where the compensation scan signal SCj has the relatively high level, and the first active period AP1 of the initialization scan signal SIj is defined as a period where the initialization scan signal SIj has the relatively high level. When each of the third and fourth transistors T3 and T4 is a P-type transistor, the second active period AP2 of the compensation scan signal SCj is defined as a period where the compensation scan signal SCj has the relatively low level, and the first active period AP1 of the initialization scan signal SIj is defined as a period where the initialization scan signal SIj has the relatively low level.

The second active period AP2 may overlap the third active period AP3 in which the write scan signal SWj has the relatively low level. During the third active period AP3, the second transistor T2 is turned on by the write scan signal SWj of the relatively low level. Then, a compensation voltage "Di-Vth" obtained by subtracting a threshold voltage Vth of the first transistor T1 from the voltage of the data signal Di supplied from the data line DLi is applied to the gate electrode of the first transistor T1. That is, the potential of the gate electrode of the first transistor T1 may correspond to the compensation voltage "Di-Vth".

The first driving voltage ELVDD and the compensation voltage "Di-Vth" may be respectively applied to opposite ends of the capacitor Cst, and charges corresponding to a voltage difference of the opposite ends of the capacitor Cst may be stored in the capacitor Cst.

Afterwards, during the fourth active period AP4, the seventh transistor T7 is turned by the black scan signal SBj of the relatively low level supplied through the black scan line SBLj. A portion of the driving current Id may be drained through the seventh transistor T7 as a bypass current Ibp.

Assuming the case where the pixel PXij displays a black image, in the case where the light-emitting element ED emits a light by a minimum driving current of the first transistor T1 flowing as the driving current Id, the pixel PXij fails to normally display a black image. Accordingly, the seventh transistor T7 of the pixel PXij in an embodiment of the disclosure may drain a portion of the minimum driving current of the first transistor T1 to a current path, which is different from a current path to the light-emitting element ED, as the bypass current Ibp. Herein, the minimum driving current of the first transistor T1 means a current flowing to the first transistor T1 under the condition that a gate-source voltage Vgs of the first transistor T1 is smaller than the threshold voltage Vth, that is, the first transistor T1 is turned off. As the minimum driving current (e.g., a current of 10 picoampere (pA) or less) flowing to the first transistor T1 is transferred to the light-emitting element ED under the condition that the first transistor T1 is turned off, an image of a black gray scale is displayed. In the case where the pixel PX displays the black image, the bypass current Ibp has a relatively large influence on the minimum driving current; in contrast, in the case where the pixel PX displays an image such as a normal image or a white image, there is a little influence of the bypass current Ibp on the driving current Id. Accordingly, when the pixel PXij displays a black image, a current (i.e., an emission current led), which corresponds to a result of subtracting the bypass current Ibp flowing through the seventh transistor T7 from the driving current Id, may be provided to the light-emitting element ED, and thus, the black image may be clearly displayed. Accordingly, the pixel PXij may implement an accurate black grayscale image by the seventh transistor T7, and thus, a contrast ratio may be improved.

Next, the emission control signal EMj supplied from the emission control line EMLj transitions from the relatively high level to the relatively low level. The fifth transistor T5 and the sixth transistor T6 are turned on by the emission control signal EMj of the relatively low level. In this case, the driving current Id is generated depending on a difference between the gate voltage of the gate electrode of the first transistor T1 and the first driving voltage ELVDD and is supplied to the light-emitting element ED through the sixth transistor T6. That is, the emission current Ied flows through the light-emitting element ED.

Figure 4A:
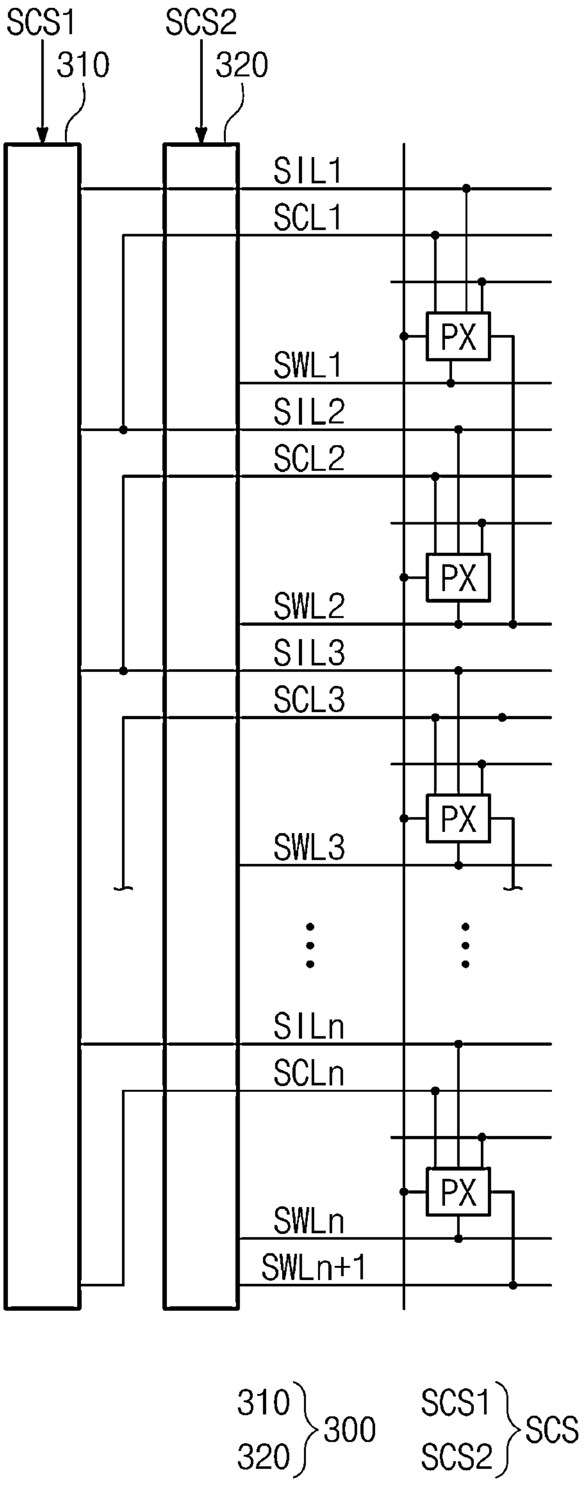
FIG. 4A is a block diagram of an embodiment of a scan driver according to the disclosure.
Figure 4B:
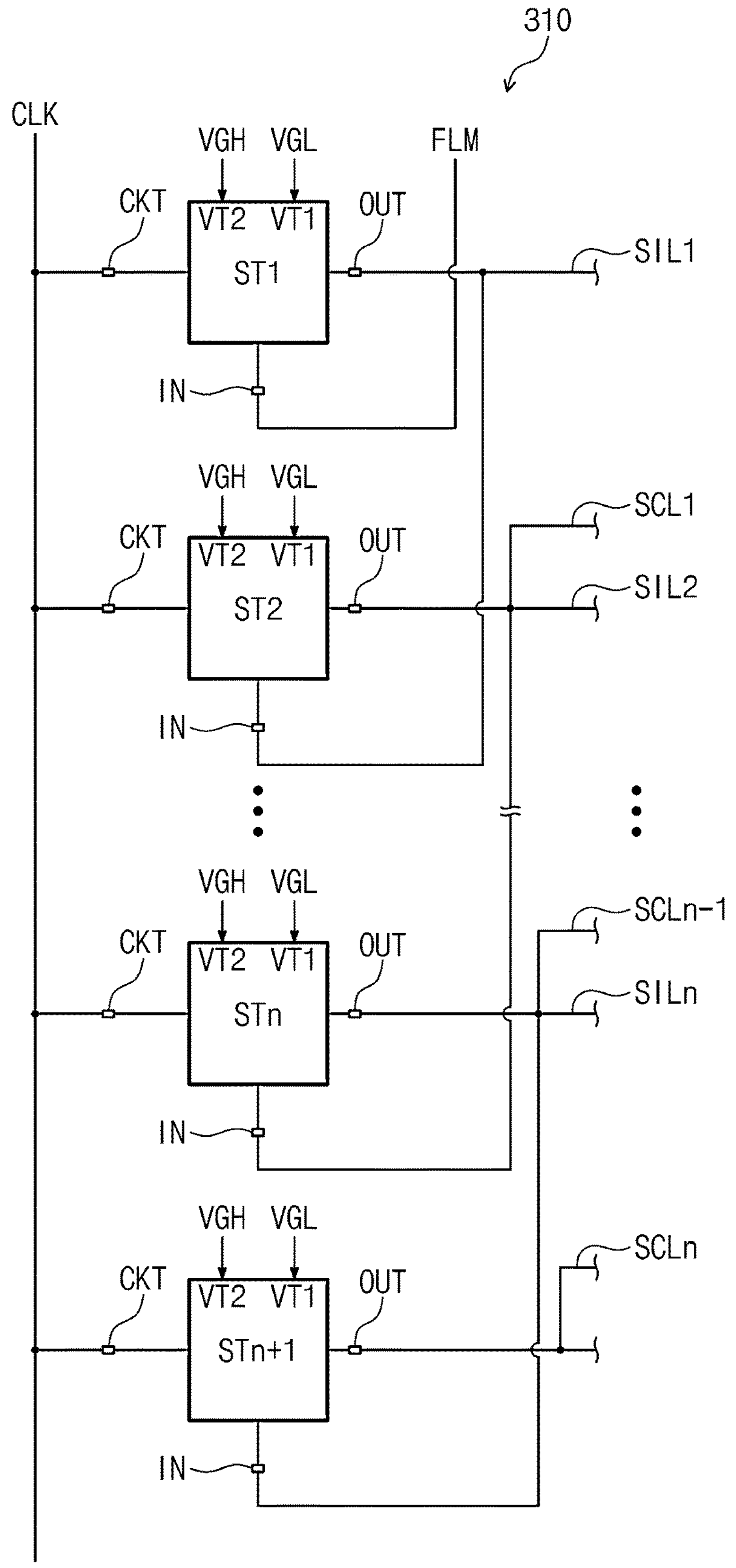
FIG. 4B is a block diagram of a first scan driving circuit illustrated in FIG. 4A.

FIG. 4A is a block diagram of an embodiment of a scan driver according to the disclosure, and FIG. 4B is a block diagram of a first scan driving circuit illustrated in FIG. 4A.

Referring to FIG. 4A, the scan driver 300 includes a first scan driving circuit 310 and a second scan driving circuit 320. The first driving control signal SCS includes a first scan control signal SCS1 that the first scan driving circuit 310 receives from the driving controller 100 and a second scan control signal SCS2 that the second scan driving circuit 320 receives from the driving controller 100. The first scan driving circuit 310 may output scan signals to scan lines in response to the first scan control signal SCS1, and the second scan driving circuit 320 may output scan signals to scan lines in response to the second scan control signal SCS2. A configuration in which the scan driver 300 includes two scan driving circuits 310 and 320 is illustrated in FIG. 4A in an embodiment, but the number of scan driving circuits included in the scan driver 300 is not limited thereto.

In response to the first scan control signal SCS1, the first scan driving circuit 310 may output initialization scan signals to the initialization scan lines SIL1 to SILn and may output compensation scan signals to the compensation scan lines SCL1 to SCLn. The second scan driving circuit 320 may output write scan signals to the write scan lines SWL1 to SWLn+1 in response to the second scan control signal SCS2. The first scan driving circuit 310 is illustrated in FIG. 4B as one of embodiments.

Referring to FIG. 4B, the first scan driving circuit 310 may include a plurality of stages ST1 to STn+1 that are sequentially connected to each other. The stages ST1 to STn+1 may have substantially the same circuit configuration as each other. For convenience of description, four stages ST1, ST2, STn, and STn+1 are illustrated in FIG. 4B as one of embodiments. Some stages ST1 to STn among the plurality of stages ST1 to STn+1 are respectively connected to the initialization scan lines SIL1 to SILn. Some stages ST2 to STn+1 among the plurality of stages ST1 to STn+1 are respectively connected to the compensation scan lines SCL1 to SCLn.

A configuration of the second scan driving circuit 320 (refer to FIG. 4A) may be similar to the configuration of the first scan driving circuit 310. That is, the second scan driving circuit 320 may include a plurality of stages ST1 to STn+1 sequentially connected to each other, and the plurality of stages ST1 to STn+1 may be respectively connected to the write scan lines SWL1 to SWLn+1 (refer to FIG. 4A).

Each of the stages ST1 to STn+1 may include an input terminal IN, a clock terminal CKT, a first voltage terminal VT1, a second voltage terminal VT2, and an output terminal OUT.

The output terminal OUT may output a scan signal. The scan signal may be an initialization scan signal or a compensation scan signal. The input terminal IN may receive a scan signal (hereinafter also referred to as a "previous carry signal") output from the output terminal OUT of a previous stage or may receive a start signal FLM. The start signal FLM may be input to the input terminal IN of the first stage ST1. The input terminal IN of the second stage ST2 may receive a first scan signal output from the output terminal OUT of the first stage ST1 as a previous carry signal.

Each of the stages ST1 to STn+1 may receive a clock signal CLK through the clock terminal CKT. The clock signal CLK may refer to a signal that swings every given period (e.g., a horizontal scan period 1H (refer to FIG. 6A)) during the driving frame DF (refer to FIG. 3).

The first voltage terminal VT1 may be a terminal to which a relatively low voltage VGL (or a first voltage) is supplied, and the second voltage terminal VT2 may be a terminal to which a high voltage VGH (or a second voltage) is supplied. Each of the low voltage VGL and the high voltage VGH may have a direct current ("DC") voltage level. The high voltage VGH may be used as the relatively high level of the scan signal, that is, a gate on voltage, and the low voltage VGL may be used as the relatively low level of the scan signal, that is, a gate off voltage. The voltage level of the low voltage VGL may be lower than the voltage level of the high voltage VGH.

The first voltage terminals VT1 of the stages ST1 to STn+1 may be connected to each other, and the second voltage terminals VT2 of the stages ST1 to STn+1 may be connected to each other.

Below, a circuit configuration of the first stage ST1 among the stages ST1 to STn+1 will be described with reference to FIG. 5. Because the stages ST1 to STn+1 have the same circuit configuration as each other, additional description associated with the circuit configuration of the remaining stages ST2 to STn+1 will be omitted to avoid redundancy.

Figure 5:
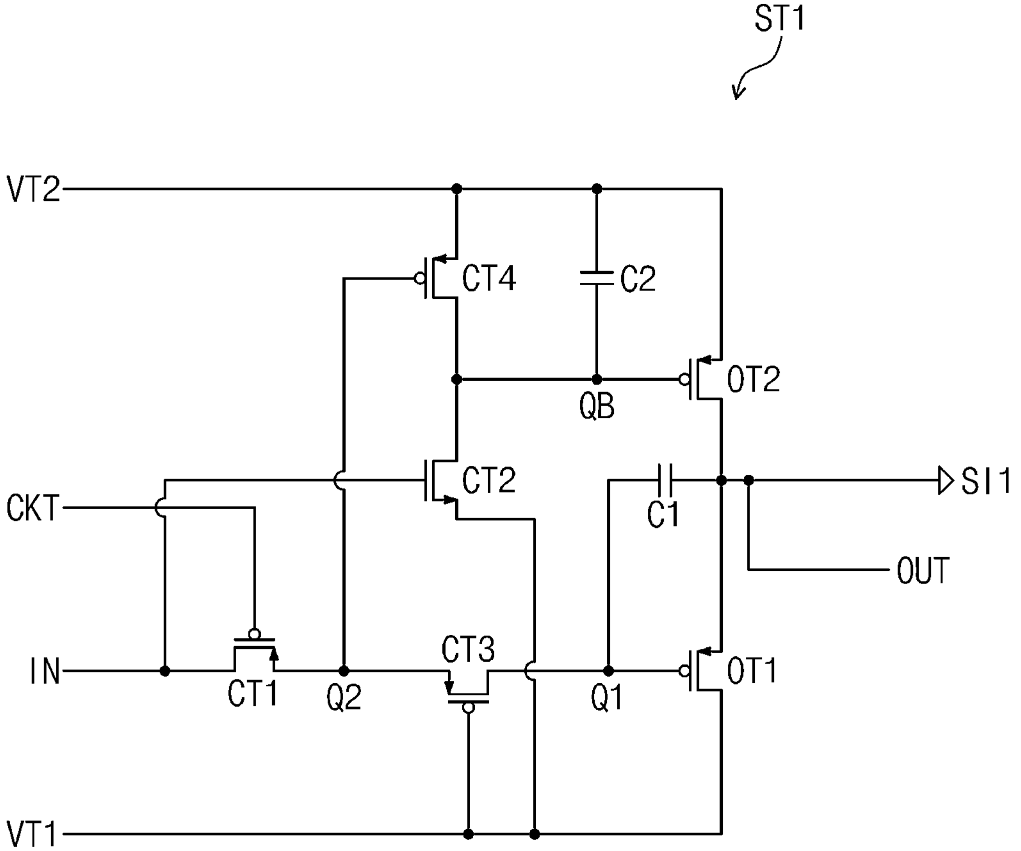
FIG. 5 is a circuit diagram of a first stage illustrated in FIG. 4B.
Figure 6A:
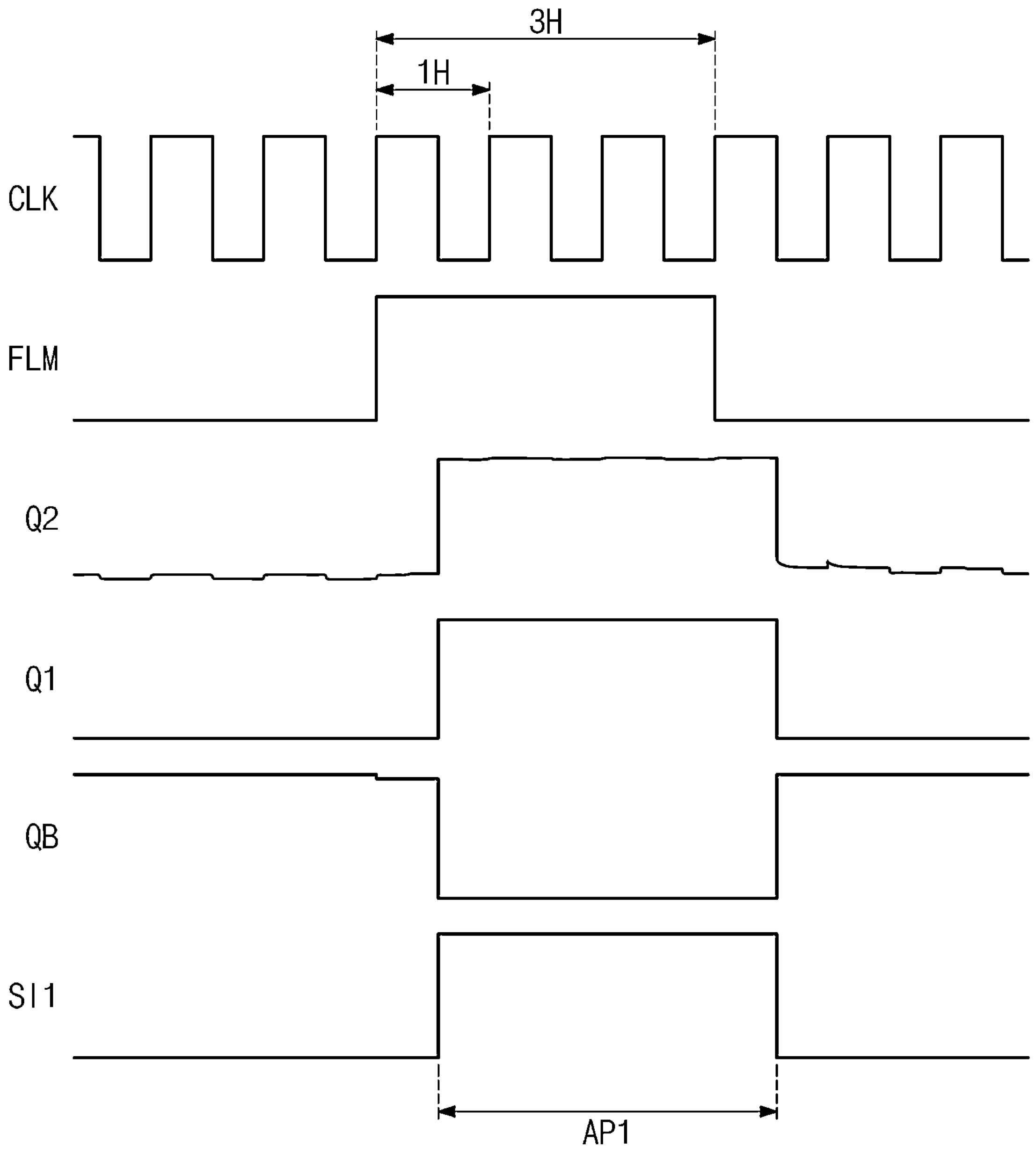
FIG. 6A is a waveform diagram for describing an operation of a first stage illustrated in FIG. 5.
Figure 6B:
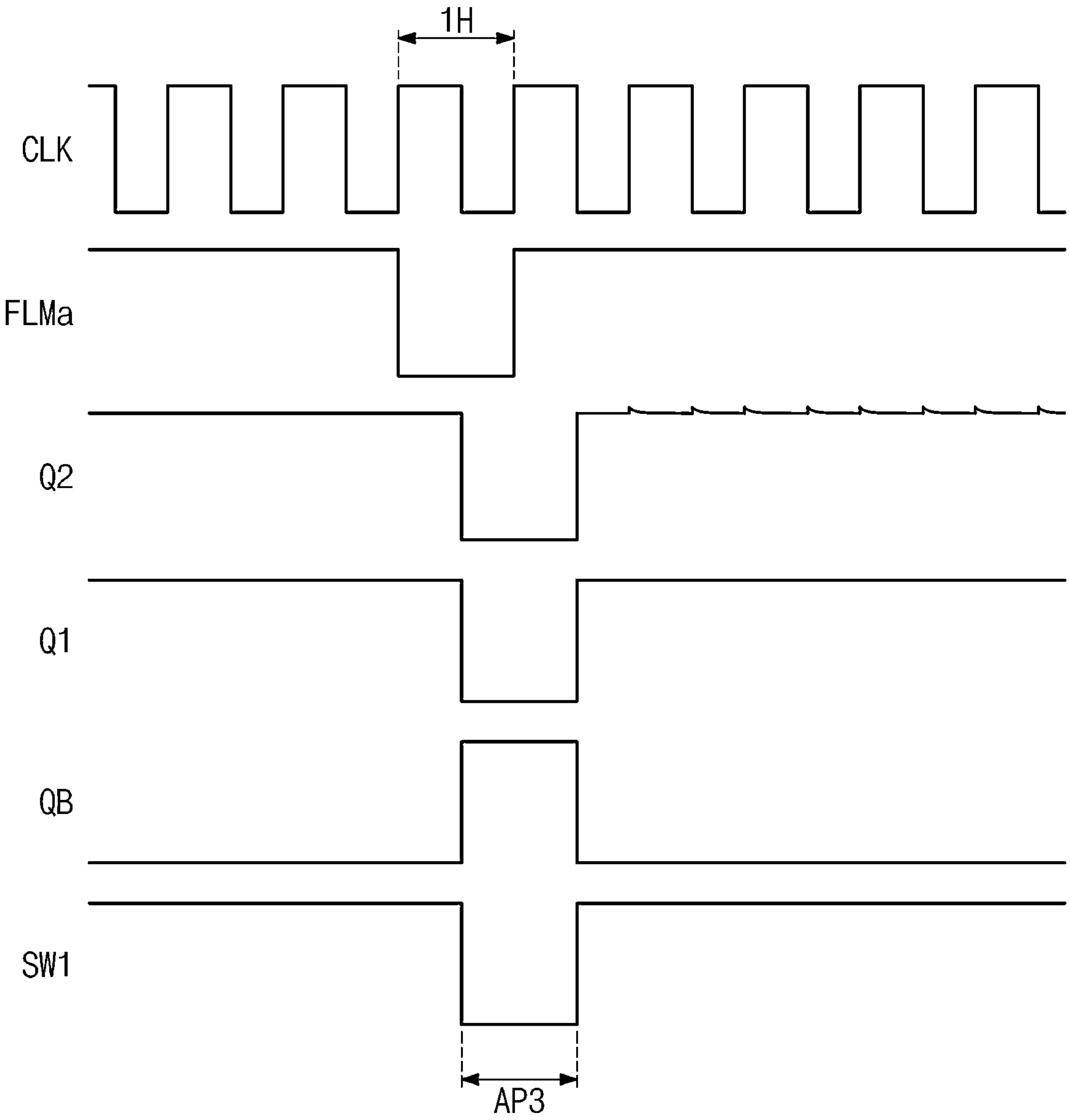
FIG. 6B is a waveform diagram for describing an embodiment of an operation of a first stage according to the disclosure.

FIG. 5 is a circuit diagram of a first stage illustrated in FIG. 4B. FIG. 6A is a waveform diagram for describing an operation of a first stage illustrated in FIG. 5. FIG. 6B is a waveform diagram for describing an embodiment of an operation of a first stage according to the disclosure.

Referring to FIG. 5, the first stage ST1 may include a first output transistor OT1 and a second output transistor OT2. The first and second output transistors OT1 and OT2 are connected to the output terminal OUT. The first output transistor OT1 is connected between the output terminal OUT and the first voltage terminal VT1 and operates in response to a potential of a first node Q1. The first output transistor OT1 includes a first electrode connected to the output terminal OUT, a second electrode connected to the first voltage terminal VT1, and a third electrode connected to the first node Q1. The second output transistor OT2 is connected between the second voltage terminal VT2 and the output terminal OUT and operates in response to a potential of a second node QB. The second output transistor OT2 includes a first electrode connected to the second voltage terminal VT2, a second electrode connected to the output terminal OUT, and a third electrode connected to the second node QB. In an embodiment of the disclosure, each of the first and second output transistors OT1 and OT2 may include an LTPS semiconductor layer and may be implemented with a first-type (or P-type) transistor.

The first stage ST1 further includes first to fourth control transistors CT1, CT2, CT3, and CT4. The first control transistor CT1 is connected between the input terminal IN receiving the start signal FLM or the previous carry signal from a previous stage and a third node Q2 and operates in response to the clock signal CLK provided through the clock terminal CKT. The first control transistor CT1 includes a first electrode connected to the third node Q2, a second electrode connected to the input terminal IN, and a third electrode connected to the clock terminal CKT. The second control transistor CT2 is connected between the second node QB and the first voltage terminal VT1 and to the input terminal IN and operates in response to the start signal FLM or the previous carry signal provided through the input terminal IN. The second control transistor CT2 includes a first electrode connected to the second node QB, a second electrode connected to the first voltage terminal VT1, and a third electrode connected to the input terminal IN. In an embodiment of the disclosure, the first control transistor CT1 may include an LTPS semiconductor layer and may be implemented with the first-type (or P-type) transistor. The second control transistor CT2 may include an oxide semiconductor layer and may be implemented with a second-type (or N-type) transistor.

The third control transistor CT3 is connected between the third node Q2 and the first node Q1 and operates in response to the low voltage VGL provided through the first voltage terminal VT1. The third control transistor CT3 includes a first electrode connected to the third node Q2, a second electrode connected to the first node Q1, and a third electrode connected to the first voltage terminal VT1. The fourth control transistor CT4 is connected between the second node QB and the second voltage terminal VT2 and operates in response to a potential of the third node Q2. The fourth control transistor CT4 includes a first electrode connected to the second voltage terminal VT2, a second electrode connected to the second node QB, and a third electrode connected to the third node Q2. In an embodiment of the disclosure, each of the third and fourth output transistors CT3 and CT4 may include an LTPS semiconductor layer and may be implemented with the first-type (or P-type) transistor.

The second control transistor CT2 may be a transistor whose type is the same as that of the third and fourth transistors T3 and T4 illustrated in FIG. 2, and each of the first and second output transistors OT1 and OT2 and the first, third, and fourth control transistors CT1, CT3, and CT4 may be a transistor whose type is different from that of the third and fourth transistors T3 and T4.

The first stage ST1 further includes a first capacitor C1 connected between the output terminal OUT and the first node Q1 and a second capacitor C2 connected between the second node QB and the second voltage terminal VT2. A potential difference between the first and third electrodes of the first output transistor OT1 may be maintained at a threshold voltage or greater by the first capacitor C1.

Referring to FIGS. 4B, 5, and 6A, in a period (i.e., a high period) in which the start signal FLM is at the relatively high level, the second control transistor CT2 is turned on. In the high period of the start signal FLM, the second control transistor CT2 may be maintained in the turn-on state. The high period of the start signal FLM may be maintained during a time period 3H corresponding to three times the horizontal scan period 1H.

Afterwards, in a period in which the clock signal CLK is at the relatively low level, the first control transistor CT1 is turned on. As the first control transistor CT1 is turned on, the potential of the third node Q2 increases to the relatively high level along the voltage level of the start signal FLM. When the potential of the third node Q2 increases to the relatively high level, the potential of the first node Q1 also increases to the relatively high level through the third control transistor CT3 of the turn-on state. Even though the clock signal CLK transitions to the relatively high level during the high period of the start signal FLM, the potentials of the first and third nodes Q1 and Q2 may be maintained at the relatively high level. When the potentials of the first and third nodes Q1 and Q2 have the relatively high level, the first output transistor OT1 is turned off.

When the potential of the third node Q2 increases to the relatively high level, the fourth control transistor CT4 may be turned off. As the fourth control transistor CT4 is turned off, the potential of the second node QB may decrease to the low voltage VGL through the second control transistor CT2 of the turn-on state.

When the potential of the second node QB has the relatively low level by the low voltage VGL, the second output transistor OT2 is turned on. The high voltage VGH may be output to the output terminal OUT through the second output transistor OT2 thus turned on. Accordingly, the first initialization scan signal SI1 may be activated to the relatively high level during the low period of the second node QB. The high period of the first initialization scan signal SI1 may be also referred to as the "first active period AP1". In an embodiment of the disclosure, the first active period AP1 of the first initialization scan signal SI1 may have the duration of 3H corresponding to three times the period 1H of the clock signal CLK.

When the start signal FLM transitions to the relatively low level, the first and third nodes Q1 and Q2 may be maintained at the relatively low level from a period in which the clock signal CLK is at the relatively low level (or from a point in time when the clock signal CLK transitions from the relatively high level to the relatively low level). When the potential of the third node Q2 decreases to the relatively low level, the fourth control transistor CT4 may be turned on. As the fourth control transistor CT4 is turned on, the potential of the second node QB may increase to the high voltage VGH. The second output transistor OT2 is turned off in response to the potential of the second node QB of the high state, and the first output transistor OT1 is turned on in response to the potential of the first node Q1 of the low state. The low voltage VGL may be output to the output terminal OUT through the first output transistor OT1 thus turned on. Accordingly, the first initialization scan signal SI1 may be deactivated to the relatively low level during the high period of the second node QB. The low period of the first initialization scan signal SI1 may be also referred to as an "inactive period".

When the low voltage VGL is output to the output terminal OUT, the potential of the first node Q1 may become lower than the low voltage VGL by the coupling of the first capacitor C1. Accordingly, when the potential of the first node Q1 is lower than the low voltage VGL, an output characteristic of the first output transistor OT1 may be enhanced, and thus, the first initialization scan signal SI1 may have a stable low state.

Referring to FIGS. 5 and 6B, in a period (i.e., a relatively low period) in which a start signal FLMa is at the relatively low level, the second control transistor CT2 is turned off. In the low period of the start signal FLMa, the second control transistor CT2 may be maintained in the turn-off state. The low period of the start signal FLMa may be maintained during one horizontal scan period 1H.

Afterwards, in a period in which the clock signal CLK is at the relatively low level, the first control transistor CT1 is turned on. As the first control transistor CT1 is turned on, the potential of the third node Q2 decreases to the relatively low level along the voltage level of the start signal FLMa. When the potential of the third node Q2 decreases to the relatively low level, the potential of the first node Q1 also decreases to the relatively low level through the third control transistor CT3 of the turn-on state. When the potentials of the first and third nodes Q1 and Q2 have the relatively low level, the first output transistor OT1 is turned on. The low voltage VGL may be output to the output terminal OUT through the first output transistor OT1 thus turned on. Accordingly, the first write scan signal SW1 may be activated to the relatively low level during the low period of the first node Q1. The low period of the first write scan signal SW1 may be also referred to as the "third active period AP3". In an embodiment of the disclosure, the third active period AP3 of the first write scan signal SW1 may have the duration corresponding to one period of the clock signal CLK.

When the potential of the third node Q2 decreases to the relatively low level, the fourth control transistor CT4 may be turned on. As the fourth control transistor CT4 is turned on, the potential of the second node QB may increase to the high voltage VGH through the fourth control transistor CT4 of the turn-on state.

When the potential of the second node QB has the relatively high level by the high voltage VGH, the second output transistor OT2 is turned off.

When the start signal FLMa transitions to the relatively high level, the first and third nodes Q1 and Q2 may be maintained at the relatively high level from a period in which the clock signal CLK is at the relatively low level (or from a point in time when the clock signal CLK transitions from the relatively high level to the relatively low level). When the potential of the third node Q2 increases to the relatively high level, the fourth control transistor CT4 may be turned off. As the fourth control transistor CT4 is turned off, the potential of the second node QB may decrease to the low voltage VGL. The second output transistor OT2 is turned on in response to the potential of the second node QB of the low state, and the first output transistor OT1 is turned off in response to the potential of the first node Q1 of the high state. The high voltage VGH may be output to the output terminal OUT through the second output transistor OT2 thus turned on. Accordingly, the first write scan signal SW1 may be deactivated to the relatively high level during the low period of the second node QB. The high period of the first write scan signal SW1 may be also referred to as an "inactive period".

Each of the stages ST1 to STn+1 includes the P-type control transistors CT1, CT3, and CT4 and the N-type control transistor CT2. Accordingly, the circuit configuration of each of the stages ST1 to STn+1 may be simplified, and thus, the width of the non-effective area NAA of the display device DD may be prevented from increasing. Also, the number of signals (e.g., the clock signal CLK) input to each of the stages ST1 to STn+1 may decrease, and thus, the power consumption of the display device DD may be reduced.

Figure 7:
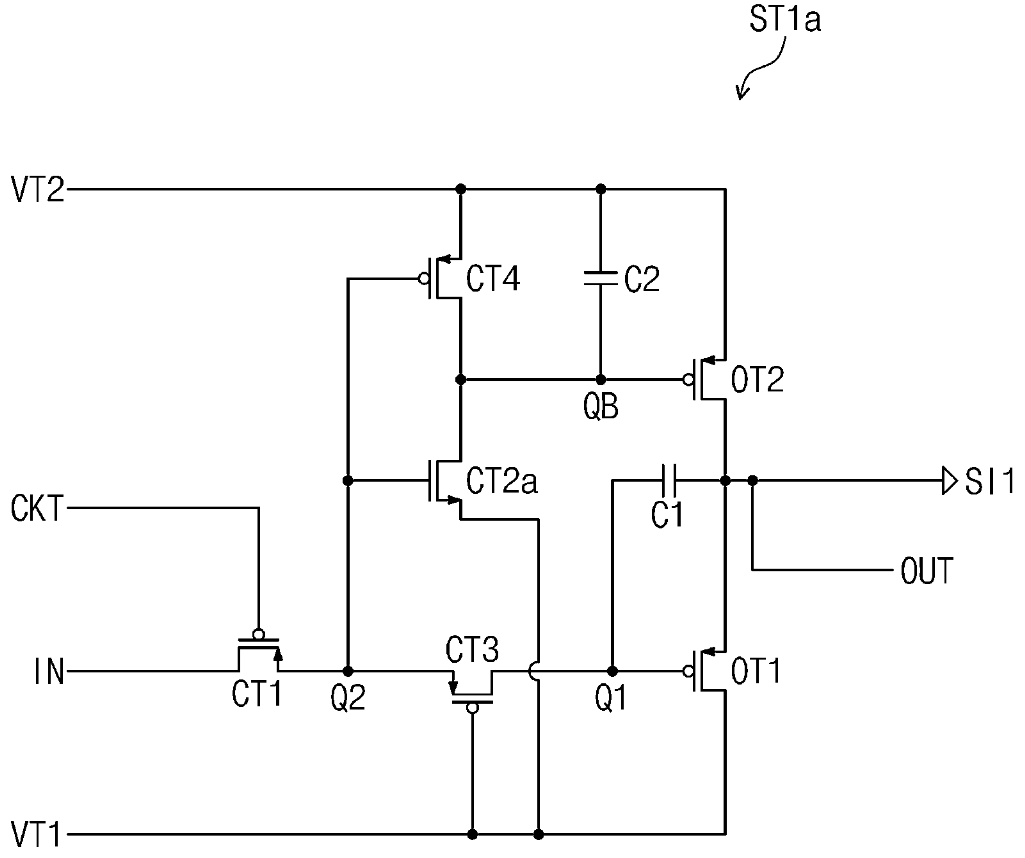
FIG. 7 is a circuit diagram of a first stage illustrated in FIG. 4B.
Figure 8:
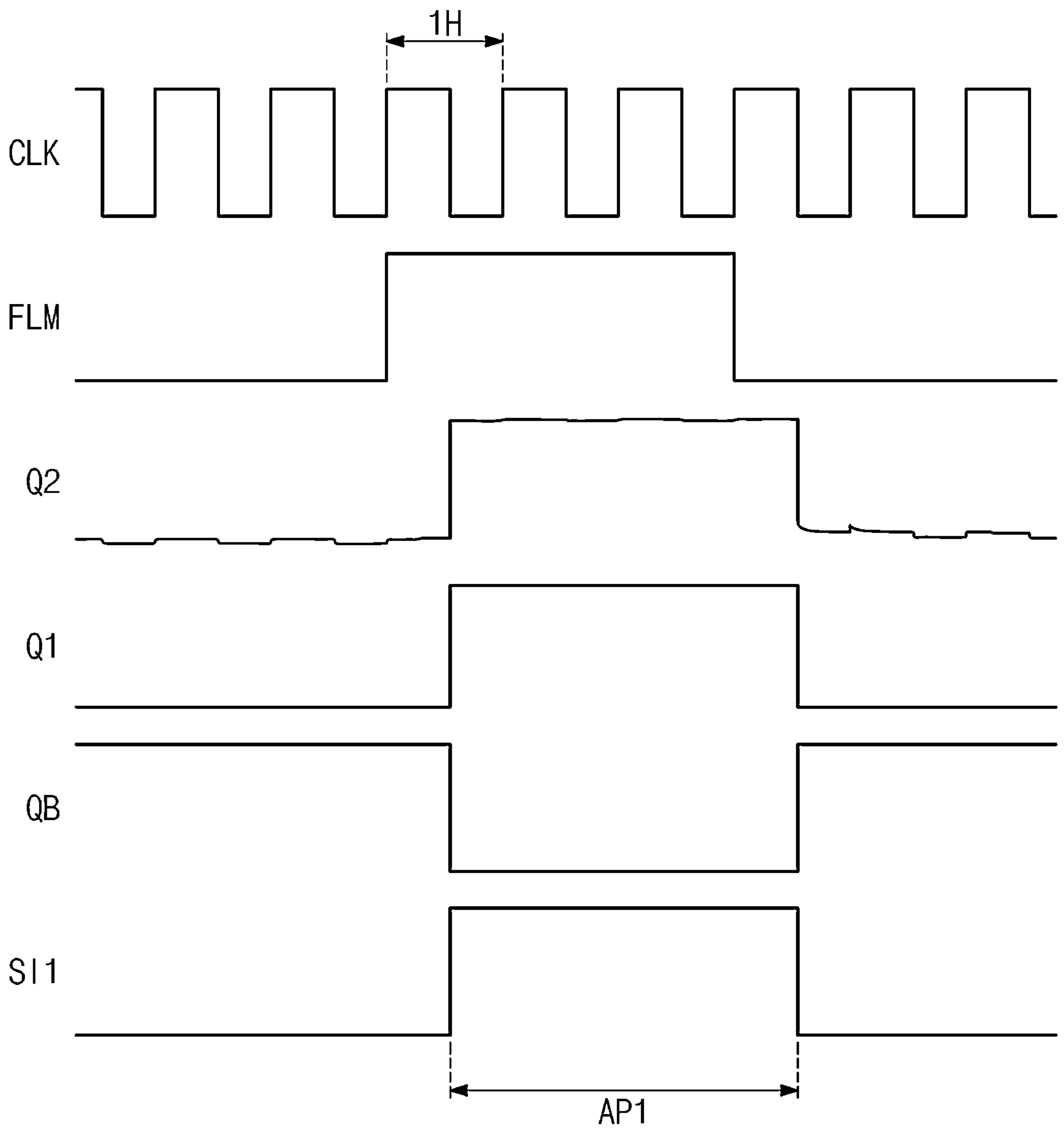
FIG. 8 is a waveform diagram for describing an operation of a first stage illustrated in FIG. 7.

FIG. 7 is a circuit diagram of a first stage illustrated in FIG. 4B. FIG. 8 is a waveform diagram for describing an operation of a first stage illustrated in FIG. 7. Components, which are the same as the components illustrated in FIG. 5, from among components illustrated in FIG. 7 are marked by the same reference numerals/signs, and thus, additional description will be omitted to avoid redundancy.

Referring to FIG. 7, a first stage ST1*a* includes the first and second output transistors OT1 and OT2, the first control transistor CT1, a second control transistor CT2*a*, the third control transistor CT3, the fourth control transistor CT4, and the first and second capacitors C1 and C2.

The second control transistor CT2*a* is connected between the second node QB and the first voltage terminal VT1 and operates in response to the potential of the third node Q2. The second control transistor CT2*a* includes a first electrode connected to the second node QB, a second electrode connected to the first voltage terminal VT1, and a third electrode connected to the third node Q2. The fourth control transistor CT4 includes the first electrode connected to the second voltage terminal VT2, the second electrode connected to the second node QB, and the third electrode connected to the third node Q2. The third electrode of the second control transistor CT2*a* and the third electrode of the fourth control transistor CT4 may be connected in common to the third node Q2. In an embodiment of the disclosure, the fourth control transistor CT4 may include an LTPS semiconductor layer and may be implemented with the first-type (or P-type) transistor. The second control transistor CT2*a* may include an oxide semiconductor layer and may be implemented with the second-type (or N-type) transistor. Accordingly, the second control transistor CT2*a* and the fourth control transistor CT4 may be alternately turned on in response to the potential of the third node Q2.

Referring to FIGS. 7 and 8, in a period (i.e., a high period) in which the start signal FLM is at the relatively high level, when the clock signal CLK transitions to the relatively low level, the first control transistor CT1 is turned on. As the first control transistor CT1 is turned on, the potential of the third node Q2 increases to the relatively high level along the voltage level of the start signal FLM. When the potential of the third node Q2 increases to the relatively high level, the potential of the first node Q1 also increases to the relatively high level through the third control transistor CT3 of the turn-on state. Even though the clock signal CLK transitions to the relatively high level during the high period of the start signal FLM, the potentials of the first and third nodes Q1 and Q2 may be maintained at the relatively high level. When the potentials of the first and third nodes Q1 and Q2 have the relatively high level, the first output transistor OT1 is turned off.

When the potential of the third node Q2 increases to the relatively high level, the fourth control transistor CT4 is turned off, and the second control transistor CT2*a* is turned on. As the fourth control transistor CT4 is turned off, the potential of the second node QB may decrease to the low voltage VGL through the second control transistor CT2*a* of the turn-on state.

When the potential of the second node QB has the relatively low level by the low voltage VGL, the second output transistor OT2 is turned on. The high voltage VGH may be output to the output terminal OUT through the second output transistor OT2 thus turned on. Accordingly, the first initialization scan signal SI1 may be activated to the relatively high level during the low period of the second node QB. The high period of the first initialization scan signal SI1 may be also referred to as the "first active period AP1".

When the start signal FLM transitions to the relatively low level, the first and third nodes Q1 and Q2 may be maintained at the relatively low level from a period in which the clock signal CLK is at the relatively low level (or from a point in time when the clock signal CLK transitions from the relatively high level to the relatively low level). When the potential of the third node Q2 decreases to the relatively low level, the fourth control transistor CT4 is turned on, and the second control transistor CT2*a* is turned off. As the fourth control transistor CT4 is turned on, the potential of the second node QB may increase to the high voltage VGH. The second output transistor OT2 is turned off in response to the potential of the second node QB of the high state, and the first output transistor OT1 is turned on in response to the potential of the first node Q1 of the low state. The low voltage VGL may be output to the output terminal OUT through the first output transistor OT1 thus turned on. Accordingly, the first initialization scan signal SI1 may be deactivated to the relatively low level during the high period of the second node QB. The low period of the first initialization scan signal SI1 may be also referred to as an "inactive period".

Figure 9:
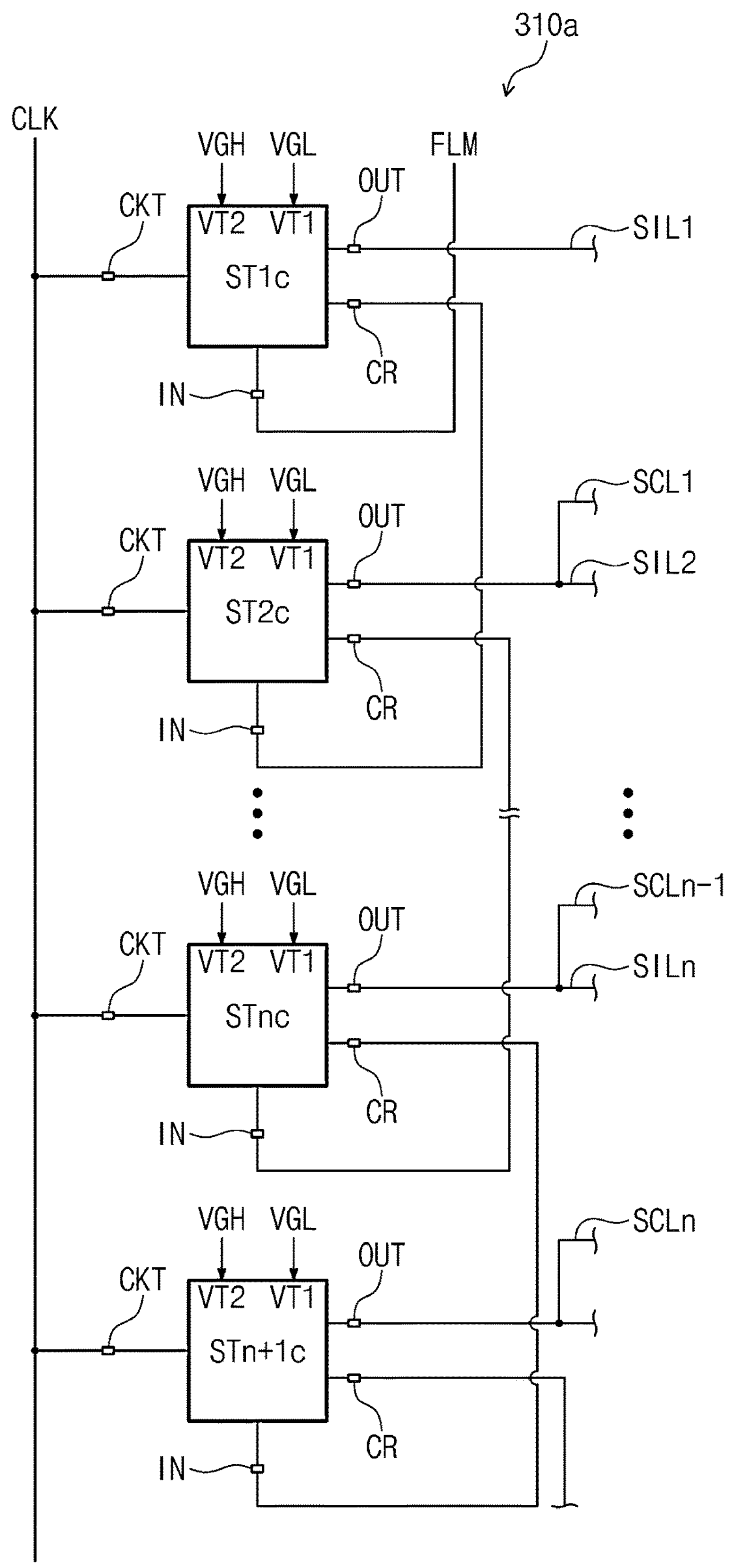
FIG. 9 is a circuit diagram of an embodiment of a first scan driving circuit according to the disclosure.

FIG. 9 is a circuit diagram of an embodiment of a first scan driving circuit according to the disclosure. Components, which are the same as the components illustrated in FIG. 4B, from among components illustrated in FIG. 9 are marked by the same reference numerals/signs, and thus, additional description will be omitted to avoid redundancy.

Referring to FIG. 9, a first scan driving circuit 310*a* may include a plurality of stages ST1*c* to STn+1c that are sequentially connected to each other. The stages ST1*c* to STn+1c may have substantially the same circuit configuration as each other. For convenience of description, four stages ST1*c*, ST2*c*, STnc, and STn+1c are illustrated in FIG. 9 as one of embodiments. Some stages ST1*c* to STnc among the plurality of stages ST1*c* to STn+1c are respectively connected to the initialization scan lines SIL1 to SILn. Some stages ST2*c* to STn+1c among the plurality of stages ST1*c* to STn+1c are respectively connected to the compensation scan lines SCL1 to SCLn.

Each of the stages ST1*c* to STn+1c may include the input terminal IN, the clock terminal CKT, the first and second voltage terminals VT1 and VT2, the output terminal OUT, and a carry terminal CR.

The output terminal OUT may output a scan signal. The scan signal may be an initialization scan signal or a compensation scan signal. The input terminal IN may receive a scan signal (hereinafter also referred to as a "previous carry signal") output from the carry terminal CR of a previous stage or may receive the start signal FLM. The start signal FLM may be input to the input terminal IN of the first stage ST1*c*. The input terminal IN of the second stage ST2*c* may receive a first scan signal output from the carry terminal CR of the first stage ST1*c* as a previous carry signal.

The carry terminal CR may output a carry signal. A phase and an amplitude of the carry signal may be substantially the same as those of a scan signal that is output through the output terminal OUT. The carry terminal CR may be connected to the input terminal IN of a next stage. Accordingly, the carry signal output through the carry terminal CR may be supplied to the input terminal IN of a next stage as a previous carry signal.

Figure 10A:
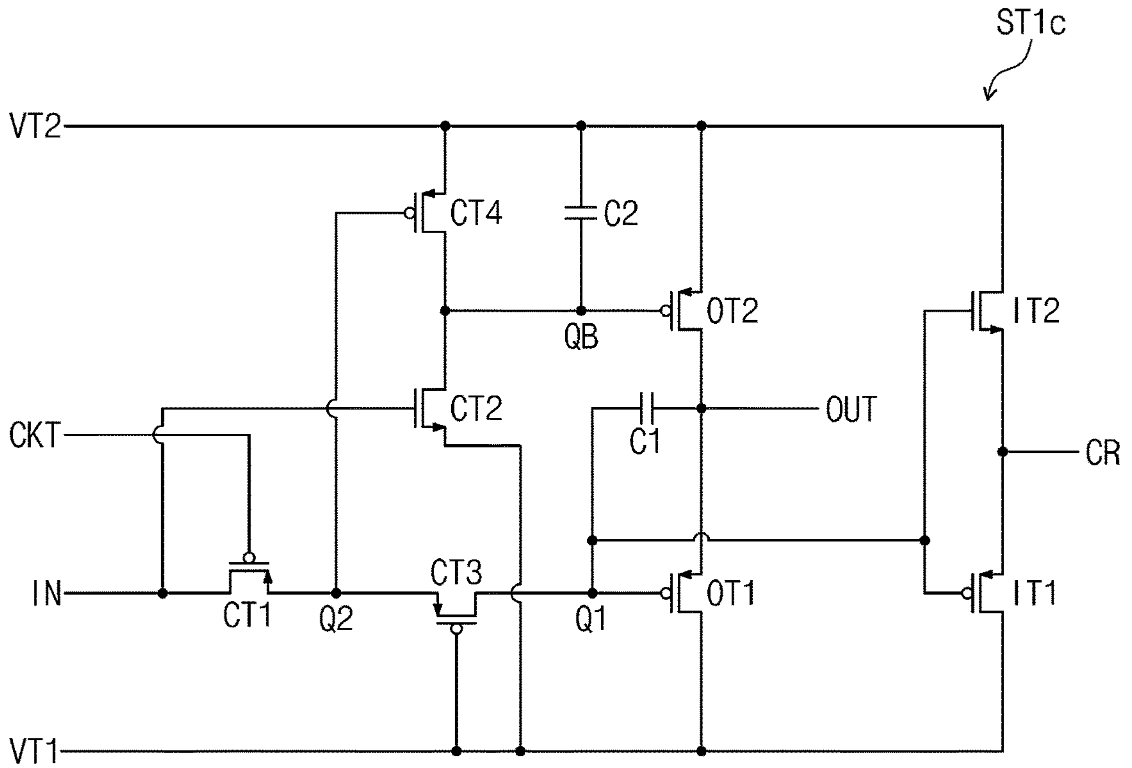
FIGS. 10A and 10B are circuit diagrams of a first stage illustrated in FIG. 9.
Figure 10B:
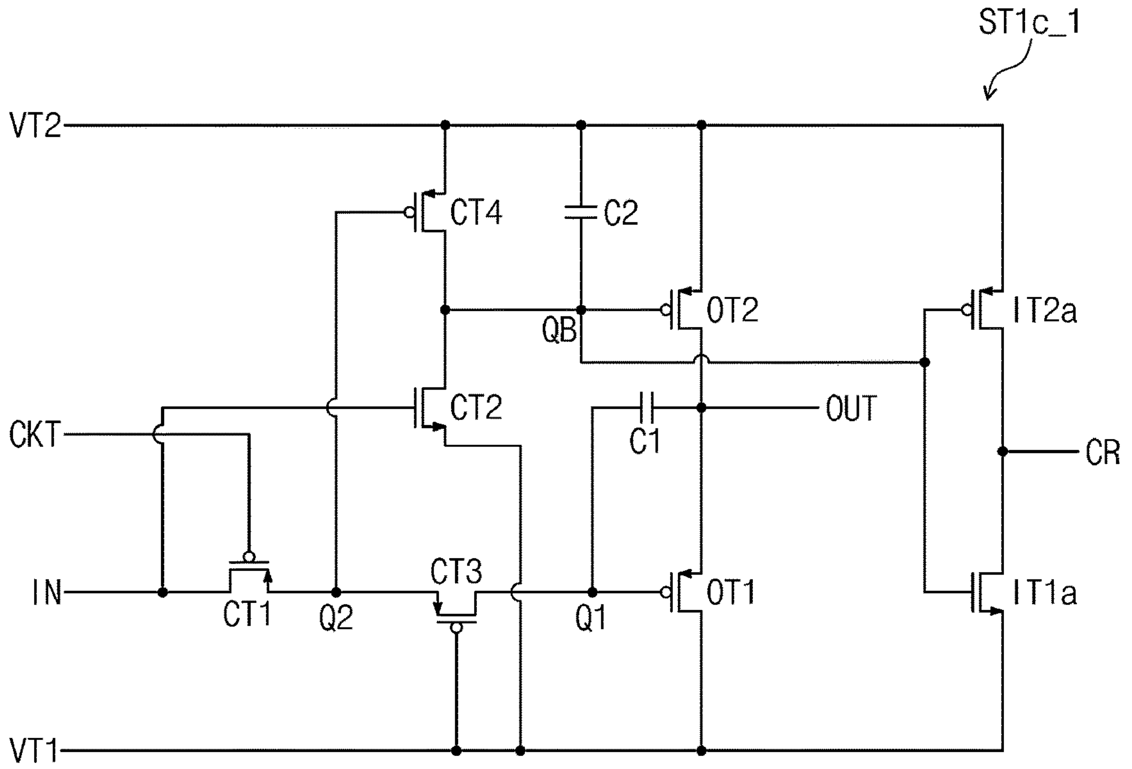

FIGS. 10A and 10B are circuit diagrams of a first stage illustrated in FIG. 9. The same reference signs/numerals are given to components the same as those illustrated in FIG. 5 from among components illustrated in FIGS. 10A and 10B, and thus, additional description will be omitted to avoid redundancy.

Referring to FIG. 10A, the first stage ST1*c* includes the first and second output transistors OT1 and OT2, the first to fourth control transistors CT1 to CT4, and the first and second capacitors C1 and C2. The first stage ST1*c* further includes a first carry transistor IT1 and a second carry transistor IT2.

The first and second carry transistors IT1 and IT2 are connected to the carry terminal CR. The first carry transistor IT1 is connected between the carry terminal CR and the first voltage terminal VT1 and operates depending on the potential of the first node Q1. The first carry transistor IT1 includes a first electrode connected to the carry terminal CR, a second electrode connected to the first voltage terminal VT1, and a third electrode connected to the first node Q1. The second carry transistor IT2 is connected between the carry terminal CR and the second voltage terminal VT2 and operates depending on the potential of the first node Q1. The second carry transistor IT2 includes a first electrode connected to the second voltage terminal VT2, a second electrode connected to the carry terminal CR, and a third electrode connected to the first node Q1.

In an embodiment of the disclosure, each of the first, third, and fourth control transistors CT1, CT3, and CT4, the first and second output transistors OT1 and OT2, and the first carry transistor IT1 may include an LTPS semiconductor layer and may implemented with the first-type (or P-type) transistor. Each of the second control transistor CT2 and the second carry transistor IT2 may include an oxide semiconductor layer and may be implemented with the second-type (or N-type) transistor.

When the potential of the first node Q1 is at the relatively high level, the first carry transistor IT1 may be turned off, and the second carry transistor IT2 may be turned on. Accordingly, the high voltage VGH may be output to the carry terminal CR through the second carry transistor IT2 thus turned on. When the potential of the first node Q1 changes to the relatively low level, the first carry transistor IT1 is turned on, and the second carry transistor IT2 is turned off. Accordingly, the low voltage VGL may be output to the carry terminal CR through the first carry transistor IT1 thus turned on.

The first carry transistor IT1 and the first output transistor OT1 may be turned on at the same time and may be turned off at the same time. Also, the second carry transistor IT2 and the second output transistor OT2 may be turned on at the same time and may be turned off at the same time. Accordingly, a phase and an amplitude of the carry signal output through the carry terminal CR may be the same as those of the scan signal.

Referring to FIG. 10B, a first stage ST1*c*_1 includes the first and second output transistors OT1 and OT2, the first to fourth control transistors CT1 to CT4, and the first and second capacitors C1 and C2. The first stage ST1*c*_1 further includes a first carry transistor IT1*a* and a second carry transistor IT2*a*.

The first and second carry transistors IT1*a* and IT2*a* are connected to the carry terminal CR. The first carry transistor IT1*a* is connected between the carry terminal CR and the first voltage terminal VT1 and operates depending on the potential of the second node QB. The first carry transistor IT1*a* includes a first electrode connected to the carry terminal CR, a second electrode connected to the first voltage terminal VT1, and a third electrode connected to the second node QB. The second carry transistor IT2*a* is connected between the carry terminal CR and the second voltage terminal VT2 and operates depending on the potential of the second node QB. The second carry transistor IT2*a* includes a first electrode connected to the second voltage terminal VT2, a second electrode connected to the carry terminal CR, and a third electrode connected to the second node QB.

In an embodiment of the disclosure, each of the first, third, and fourth control transistors CT1, CT3, and CT4, the first and second output transistors OT1 and OT2, and the second carry transistor IT2*a* may include an LTPS semiconductor layer and may implemented with the first-type (or P-type) transistor. Each of the second control transistor CT2 and the first carry transistor IT1*a* may include an oxide semiconductor layer and may be implemented with the second-type (or N-type) transistor.

When the potential of the second node QB is at the relatively low level, the first carry transistor IT1*a* may be turned off, and the second carry transistor IT2*a* may be turned on. Accordingly, the high voltage VGH may be output to the carry terminal CR through the second carry transistor IT2*a* thus turned on. When the potential of the second node QB changes to the relatively high level, the first carry transistor IT1*a* is turned on, and the second carry transistor IT2*a* is turned off. Accordingly, the low voltage VGL may be output to the carry terminal CR through the first carry transistor IT1*a* thus turned on.

The first carry transistor IT1*a* and the first output transistor OT1 may be turned on at the same time and may be turned off at the same time. Also, the second carry transistor IT2*a* and the second output transistor OT2 may be turned on at the same time and may be turned off at the same time. Accordingly, a phase and an amplitude of the carry signal output through the carry terminal CR may be the same as those of the scan signal.

Figure 11A:
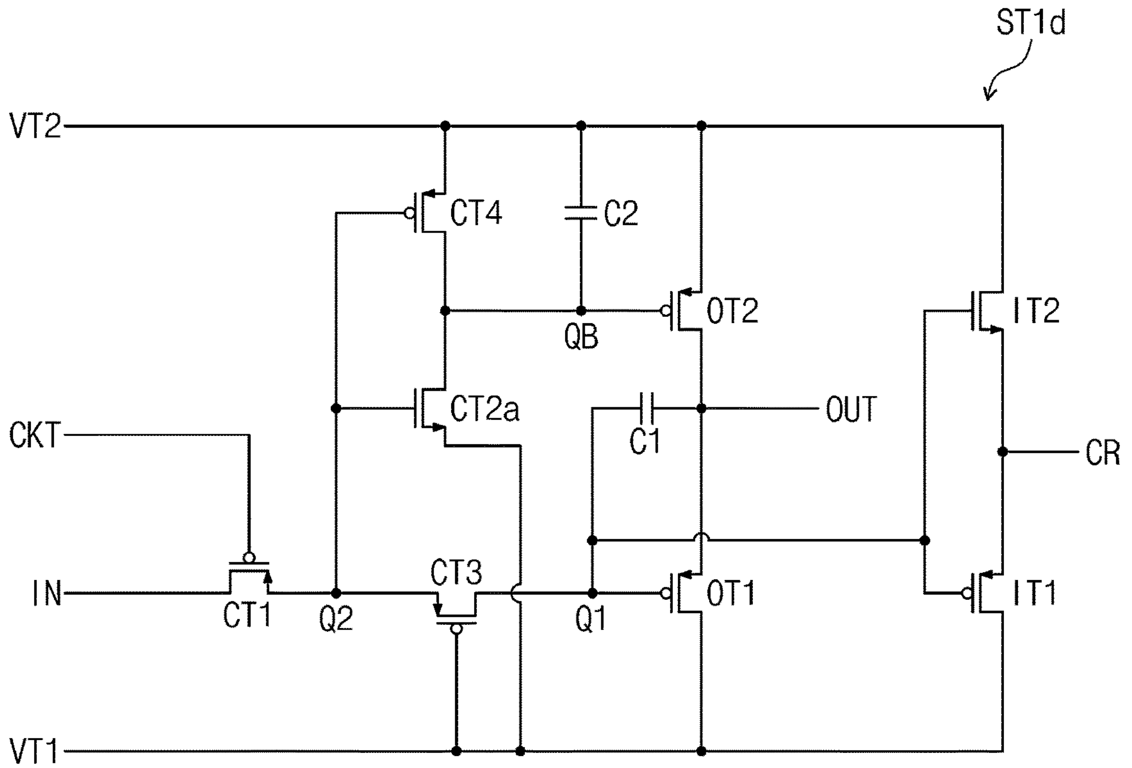
FIGS. 11A and 11B are circuit diagrams of a first stage illustrated in FIG. 9.
Figure 11B:
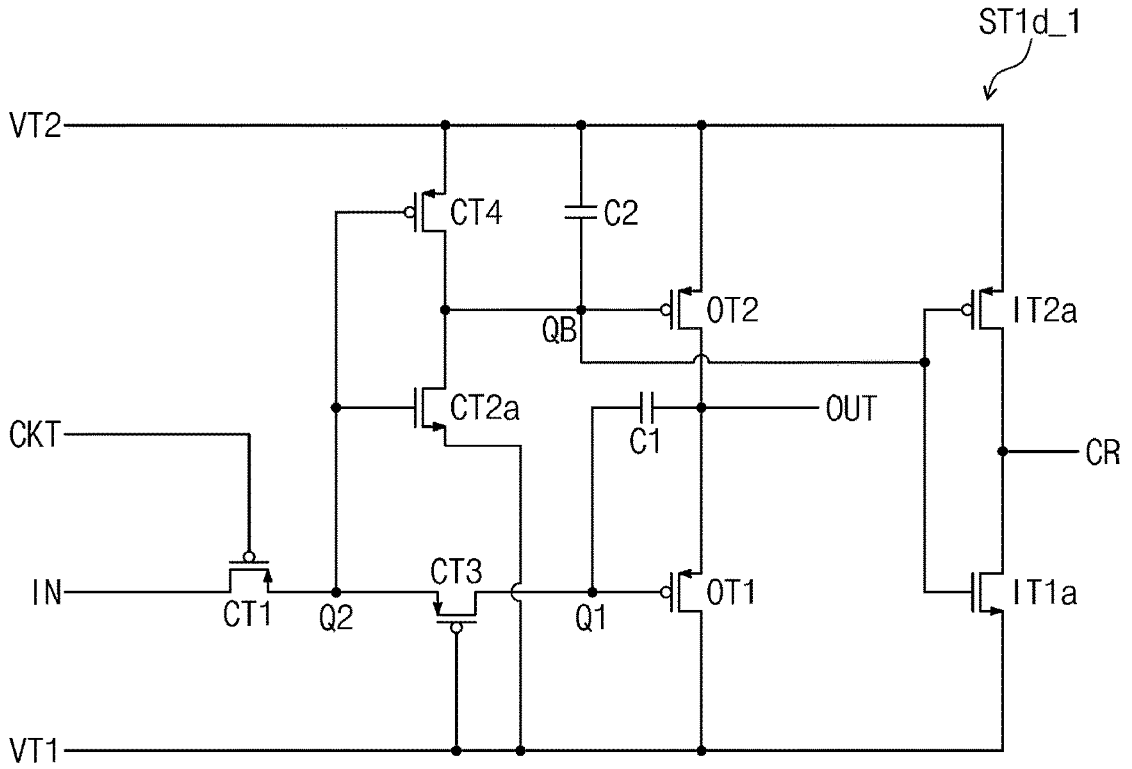

FIGS. 11A and 11B are circuit diagrams of a first stage illustrated in FIG. 9. However, the same reference signs/numerals are given to components the same as those illustrated in FIG. 7 from among components illustrated in FIGS. 11A and 11B, and thus, additional description will be omitted to avoid redundancy.

Referring to FIG. 11A, a first stage ST1*d* includes the first and second output transistors OT1 and OT2, the first to fourth control transistors CT1, CT2*a*, CT3, and CT4, and the first and second capacitors C1 and C2. The first stage ST1*d* further includes the first carry transistor IT1 and the second carry transistor IT2.

The first and second carry transistors IT1 and IT2 are connected to the carry terminal CR. The first carry transistor IT1 is connected between the carry terminal CR and the first voltage terminal VT1 and operates depending on the potential of the first node Q1. The first carry transistor IT1 includes a first electrode connected to the carry terminal CR, a second electrode connected to the first voltage terminal VT1, and a third electrode connected to the first node Q1. The second carry transistor IT2 is connected between the carry terminal CR and the second voltage terminal VT2 and operates depending on the potential of the first node Q1. The second carry transistor IT2 includes a first electrode connected to the second voltage terminal VT2, a second electrode connected to the carry terminal CR, and a third electrode connected to the first node Q1.

In an embodiment of the disclosure, each of the first, third, and fourth control transistors CT1, CT3, and CT4, the first and second output transistors OT1 and OT2, and the first carry transistor IT1 may include an LTPS semiconductor layer and may implemented with the first-type (or P-type) transistor. Each of the second control transistor CT2*a* and the second carry transistor IT2 may include an oxide semiconductor layer and may be implemented with the second-type (or N-type) transistor.

When the potential of the first node Q1 is at the relatively high level, the first carry transistor IT1 may be turned off, and the second carry transistor IT2 may be turned on. Accordingly, the high voltage VGH may be output to the carry terminal CR through the second carry transistor IT2 thus turned on. When the potential of the first node Q1 changes to the relatively low level, the first carry transistor IT1 is turned on, and the second carry transistor IT2 is turned off. Accordingly, the low voltage VGL may be output to the carry terminal CR through the first carry transistor IT1 thus turned on.

The first carry transistor IT1 and the first output transistor OT1 may be turned on at the same time and may be turned off at the same time. Also, the second carry transistor IT2 and the second output transistor OT2 may be turned on at the same time and may be turned off at the same time. Accordingly, a phase and an amplitude of the carry signal output through the carry terminal CR may be the same as those of the scan signal.

Referring to FIG. 11B, a first stage ST1*d*_1 includes the first and second output transistors OT1 and OT2, the first to fourth control transistors CT1, CT2*a*, CT3, and CT4, and the first and second capacitors C1 and C2. The first stage ST1*d*_1 further includes the first carry transistor IT1*a* and the second carry transistor IT2*a*.

The first and second carry transistors IT1*a* and IT2*a* are connected to the carry terminal CR. The first carry transistor IT1*a* is connected between the carry terminal CR and the first voltage terminal VT1 and operates depending on the potential of the second node QB. The first carry transistor IT1*a* includes a first electrode connected to the carry terminal CR, a second electrode connected to the first voltage terminal VT1, and a third electrode connected to the second node QB. The second carry transistor IT2*a* is connected between the carry terminal CR and the second voltage terminal VT2 and operates depending on the potential of the second node QB. The second carry transistor IT2*a* includes a first electrode connected to the second voltage terminal VT2, a second electrode connected to the carry terminal CR, and a third electrode connected to the second node QB.

In an embodiment of the disclosure, each of the first, third, and fourth control transistors CT1, CT3, and CT4, the first and second output transistors OT1 and OT2, and the second carry transistor IT2*a* may include an LTPS semiconductor layer and may implemented with the first-type (or P-type) transistor. Each of the second control transistor CT2*a* and the first carry transistor IT1*a* may include an oxide semiconductor layer and may be implemented with the second-type (or N-type) transistor.

When the potential of the second node QB is at the relatively low level, the first carry transistor IT1*a* may be turned off, and the second carry transistor IT2*a* may be turned on. Accordingly, the high voltage VGH may be output to the carry terminal CR through the second carry transistor IT2*a* thus turned on. When the potential of the second node QB changes to the relatively high level, the first carry transistor IT1*a* is turned on, and the second carry transistor IT2*a* is turned off. Accordingly, the low voltage VGL may be output to the carry terminal CR through the first carry transistor IT1*a* thus turned on.

The first carry transistor IT1*a* and the first output transistor OT1 may be turned on at the same time and may be turned off at the same time. Also, the second carry transistor IT2*a* and the second output transistor OT2 may be turned on at the same time and may be turned off at the same time. Accordingly, a phase and an amplitude of the carry signal output through the carry terminal CR may be the same as those of the scan signal.

Figure 12:
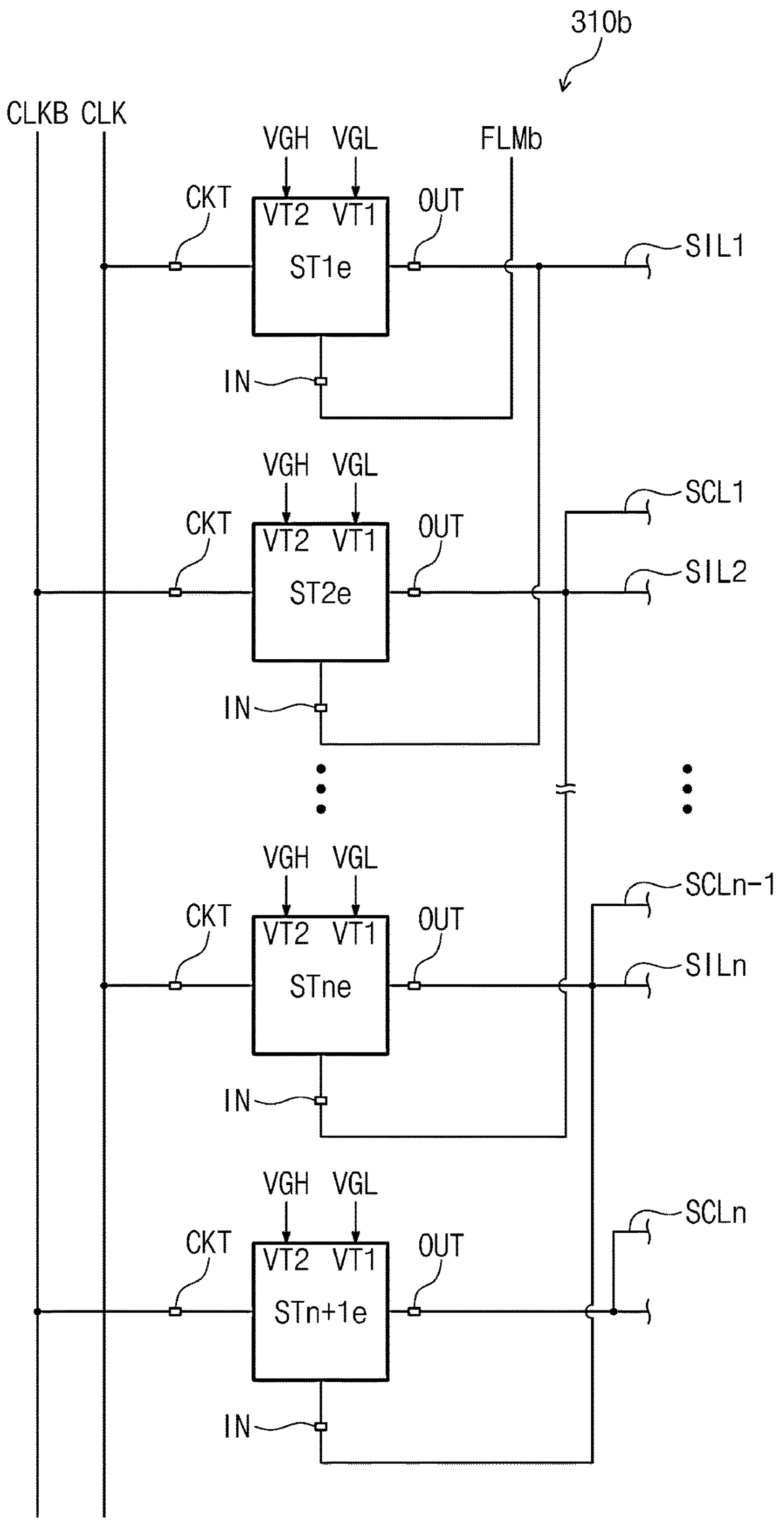
FIG. 12 is a block diagram of a first scan driving circuit illustrated in FIG. 4A.

FIG. 12 is a block diagram of a first scan driving circuit illustrated in FIG. 4A. Components, which are the same as the components illustrated in FIG. 4B, from among components illustrated in FIG. 12 are marked by the same reference numerals/signs, and thus, additional description will be omitted to avoid redundancy.

Referring to FIG. 12, a first scan driving circuit 310*b* may include a plurality of stages ST1*e* to STn+1e that are sequentially connected to each other. The stages ST1*e* to STn+1e may have substantially the same circuit configuration as each other. For convenience of description, four stages ST1*e*, ST2*e*, STne, and STn+1e are illustrated in FIG. 12 as one of embodiments.

Each of the stages ST1*e* to STn+1e may include the input terminal IN, the clock terminal CKT, the first voltage terminal VT1, the second voltage terminal VT2, and the output terminal OUT.

The output terminal OUT may output a scan signal. The scan signal may be an initialization scan signal or a compensation scan signal. The input terminal IN may receive a scan signal (hereinafter also referred to as a "previous carry signal") output from the output terminal OUT of a previous stage or may receive a start signal FLMb. The start signal FLMb may be input to the input terminal IN of the first stage ST1*e*. The input terminal IN of the second stage ST2*e* may receive a first scan signal output from the output terminal OUT of the first stage ST1*e* as a previous carry signal.

Each of the stages ST1*e* to STn+1e may receive a first clock signal CLK or a second clock signal CLKB through the clock terminal CKT. The first clock signal CLK may refer to a signal that swings every given period (e.g., a time period (i.e., 3H) corresponding to three times the horizontal scan period 1H (refer to FIG. 6A)) during the driving frame DF (refer to FIG. 3). The period of the second clock signal CLKB may be the same as the period of the first clock signal CLK, and the phase of the second clock signal CLKB may be different from the phase of the first clock signal CLK. The second clock signal CLKB may refer to a signal that swings every period corresponding to 3H.

Figure 14A:
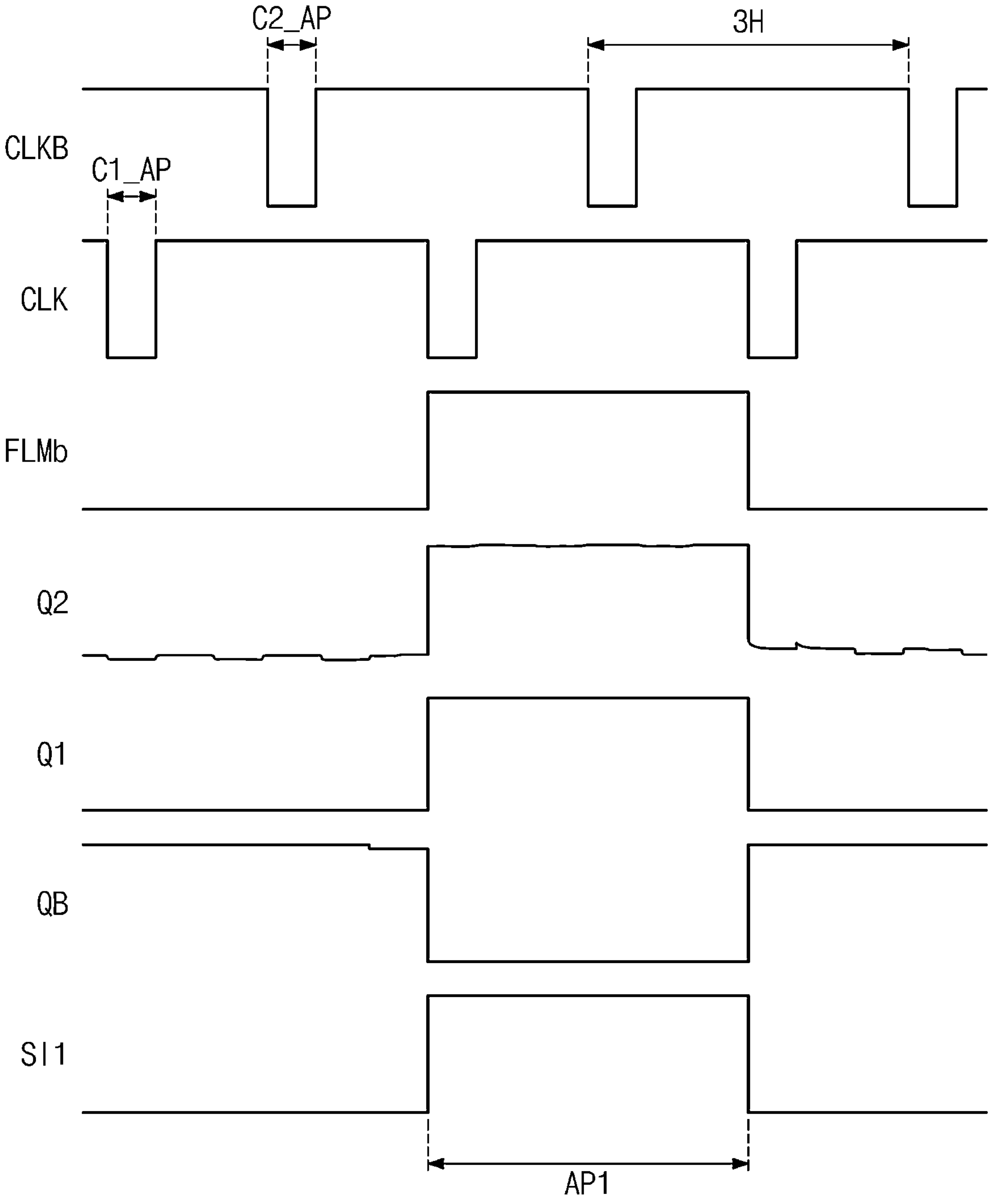
FIG. 14A is a waveform diagram for describing an operation of a first stage illustrated in FIG. 13A.

The first clock signal CLK may include a clock active period C1_AP (refer to FIG. 14A), and the second clock signal CLKB may include a clock active period C2_AP (refer to FIG. 14A). The clock active period C1_AP of the first clock signal CLK may have the same duration as that of the clock active period C2_AP of the second clock signal CLKB.

In an embodiment of the disclosure, the first clock signal CLK may be applied to the clock terminal CKT of each of odd-numbered stages ST1*e* and STne among the stages ST1*e* to STn+1e, and the second clock signal CLKB may be applied to the clock terminal CKT of each of even-numbered stages ST2*e* and STn+1e among the stages ST1*e* to STn+1e.

Below, a circuit configuration of the first stage ST1*e* among the stages ST1*e* to STn+1e will be described with reference to FIGS. 13A and 13B. Because the stages ST1*e* to STn+1e have the same circuit configuration as each other, additional description associated with the circuit configuration of the remaining stages ST2*e* to STn+1e will be omitted to avoid redundancy.

Figure 13A:
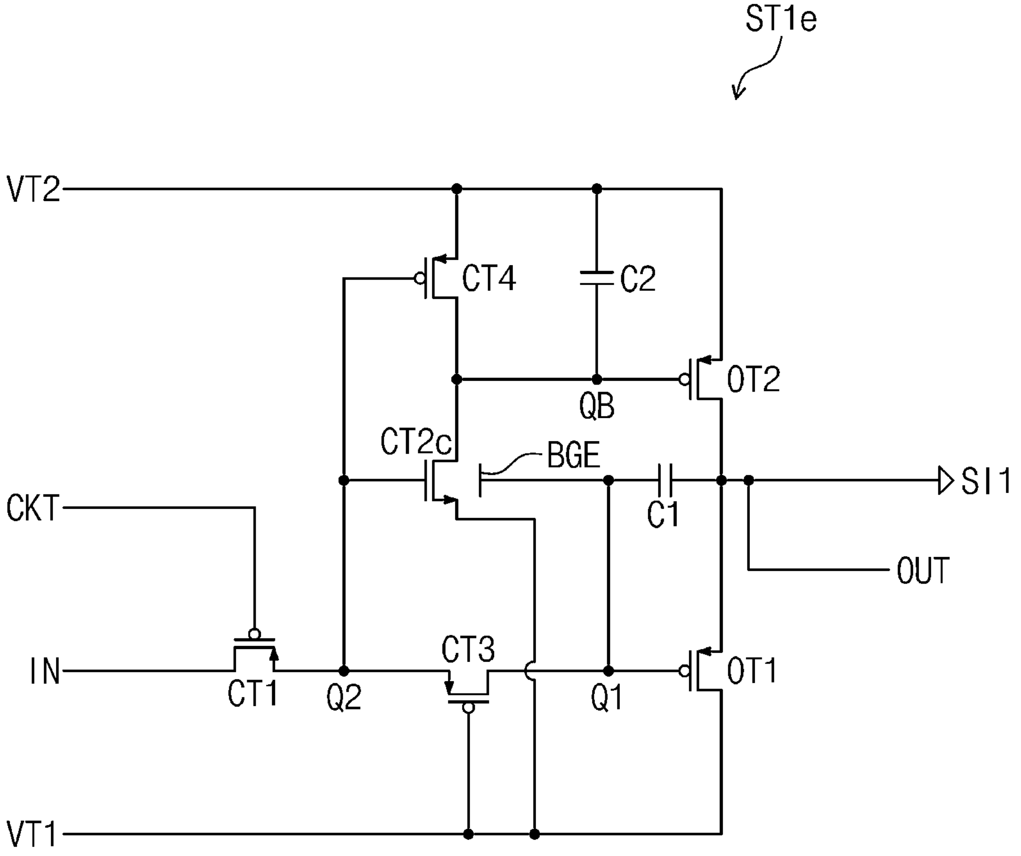
FIG. 13A is a circuit diagram of a first stage illustrated in FIG. 12.
Figure 13B:
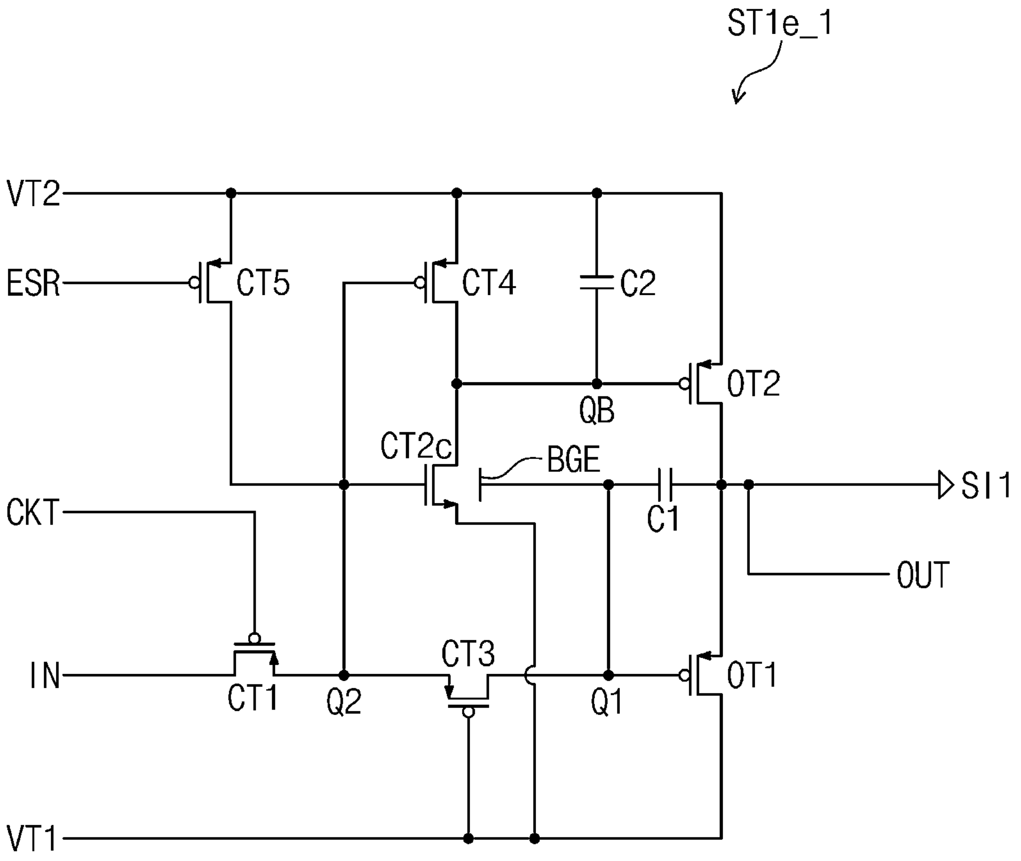
FIG. 13B is a circuit diagram of a first stage illustrated in FIG. 12.
Figure 14B:
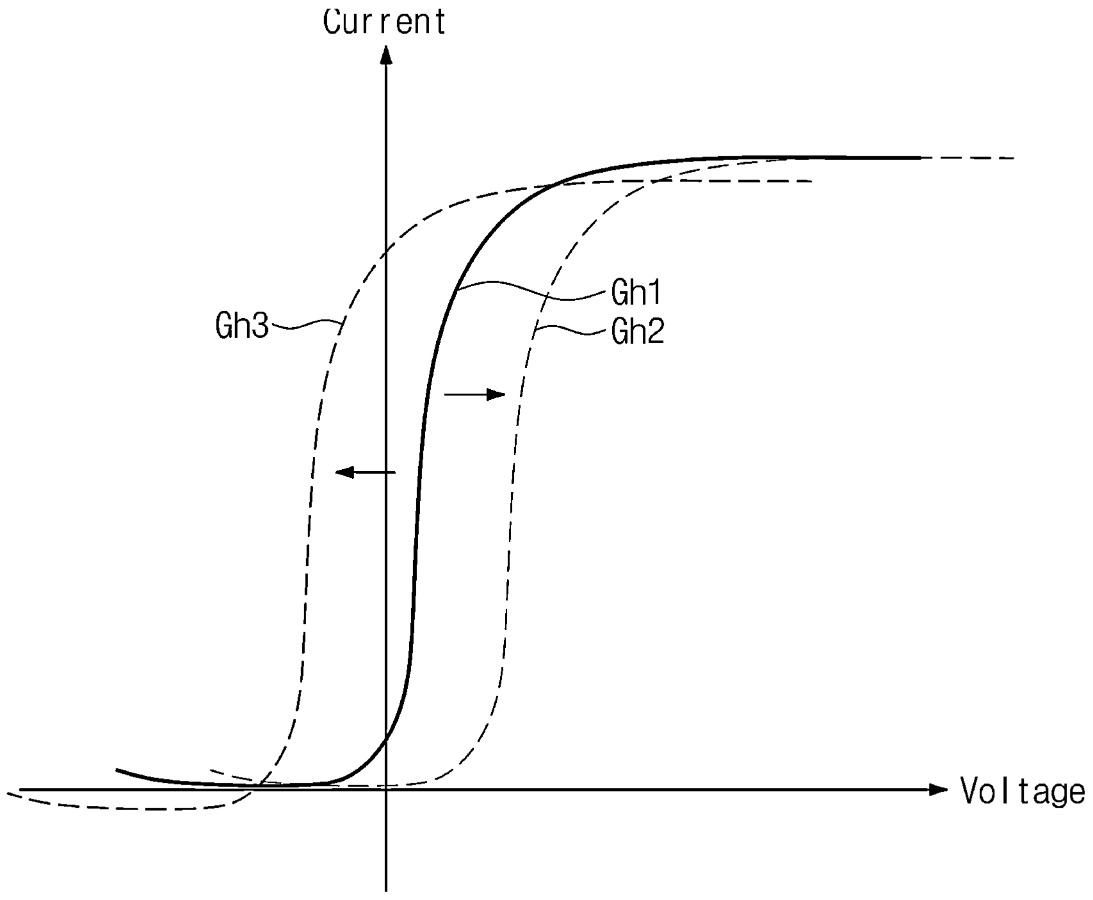
FIG. 14B is a waveform diagram for describing an operation of a second control transistor illustrated in FIG. 13A.

FIGS. 13A and 13B are circuit diagrams of a first stage illustrated in FIG. 12, and FIG. 14A is a waveform diagram for describing an operation of a first stage illustrated in FIG. 13A. FIG. 14B is a waveform diagram for describing an operation of a second control transistor illustrated in FIG. 13A. Components, which are the same as the components illustrated in FIGS. 5 and 6A, from among components illustrated in FIGS. 13A, 13B, and 14A are marked by the same reference signs, and thus, additional description will be omitted to avoid redundancy.

Referring to FIG. 13A, a first stage ST1*e* includes the first and second output transistors OT1 and OT2, the first control transistor CT1, a second control transistor CT2*c*, the third control transistor CT3, the fourth control transistor CT4, and the first and second capacitors C1 and C2.

The second control transistor CT2*c* is connected between the second node QB and the first voltage terminal VT1 and operates in response to the potential of the third node Q2. The second control transistor CT2*c* includes a first electrode connected to the second node QB, a second electrode connected to the first voltage terminal VT1, and a third electrode connected to the third node Q2. The second control transistor CT2*c* further includes a bottom gate electrode BGE connected to the first node Q1.

The fourth control transistor CT4 includes the first electrode connected to the second voltage terminal VT2, the second electrode connected to the second node QB, and the third electrode connected to the third node Q2. The third electrode of the second control transistor CT2*c* and the third electrode of the fourth control transistor CT4 may be connected in common to the third node Q2. In an embodiment of the disclosure, the fourth control transistor CT4 may include an LTPS semiconductor layer and may be implemented with the first-type (or P-type) transistor. The second control transistor CT2*c* may include an oxide semiconductor layer and may be implemented with the second-type (or N-type) transistor. Accordingly, the second control transistor CT2*c* and the fourth control transistor CT4 may be alternately turned on in response to the potential of the third node Q2.

Referring to FIGS. 4B, 13A, and 14A, in a period (i.e., a high period) in which the start signal FLMb is at the relatively high level, the second control transistor CT2*c* is turned on. In the high period of the start signal FLMb, the second control transistor CT2*c* may be maintained in the turn-on state. The high period of the start signal FLMb may be maintained during three horizontal scan periods 3H.

Afterwards, in a period in which the first clock signal CLK is at the relatively low level, the first control transistor CT1 is turned on. As the first control transistor CT1 is turned on, the potential of the third node Q2 increases to the relatively high level along the voltage level of the start signal FLMb. When the potential of the third node Q2 increases to the relatively high level, the potential of the first node Q1 also increases to the relatively high level through the third control transistor CT3 of the turn-on state. Even though the first clock signal CLK transitions to the relatively high level during the high period of the start signal FLMb, the potentials of the first and third nodes Q1 and Q2 may be maintained at the relatively high level. When the potentials of the first and third nodes Q1 and Q2 have the relatively high level, the first output transistor OT1 is turned off.

When the potential of the third node Q2 increases to the relatively high level, the fourth control transistor CT4 may be turned off. As the fourth control transistor CT4 is turned off, the potential of the second node QB may decrease to the low voltage VGL through the second control transistor CT2*c* of the turn-on state.

When the potential of the second node QB has the relatively low level by the low voltage VGL, the second output transistor OT2 is turned on. The high voltage VGH may be output to the output terminal OUT through the second output transistor OT2 thus turned on. Accordingly, the first initialization scan signal SI1 may be activated to the relatively high level during the low period of the second node QB. The high period of the first initialization scan signal SI1 may be also referred to as the "first active period AP1". In an embodiment of the disclosure, the first active period AP1 of the first initialization scan signal SI1 may have the duration corresponding to one period of the first clock signal CLK (i.e., corresponding to 3H).

When the start signal FLMb transitions to the relatively low level, the first and third nodes Q1 and Q2 may be maintained at the relatively low level from a period in which the first clock signal CLK is at the relatively low level (or from a point in time when the first clock signal CLK transitions from the relatively high level to the relatively low level). When the potential of the third node Q2 decreases to the relatively low level, the fourth control transistor CT4 may be turned on, and the second control transistor CT2*c* may be turned off. As the fourth control transistor CT4 is turned on, the potential of the second node QB may increase to the high voltage VGH. The second output transistor OT2 is turned off in response to the potential of the second node QB of the high state, and the first output transistor OT1 is turned on in response to the potential of the first node Q1 of the low state. The low voltage VGL may be output to the output terminal OUT through the first output transistor OT1 thus turned on.

When the low voltage VGL is output to the output terminal OUT, the potential of the first node Q1 may decrease to a voltage (hereinafter also referred to as a "down low-voltage DVGL") lower than the low voltage VGL by the coupling of the first capacitor C1. Accordingly, when the potential of the first node Q1 is lower than the down low-voltage DVGL, an output characteristic of the first output transistor OT1 may be enhanced, and thus, the first initialization scan signal S1 may have a stable low state.

In FIG. 14B, a current-voltage curve Gh1 indicates a current-voltage characteristic of a second control transistor not including the bottom gate electrode BGE, a current-voltage curve Gh2 indicates a current-voltage characteristic of the second control transistor CT2*c* being in the turn-off state, and a current-voltage curve Gh3 indicates a current-voltage characteristic of the second control transistor CT2*c* being in the turn-on state.

The bottom gate electrode BGE of the second control transistor CT2*c* may be connected to the first node Q1 and may receive the down low-voltage DVGL. Accordingly, the third electrode of the second control transistor CT2*c* may have the low voltage VGL, and the bottom gate electrode BGE may have the down low-voltage DVGL lower than the low voltage VGL. In the turn-off state of the second control transistor CT2*c*, a voltage Vgs between the gate electrode and the source electrode of the second control transistor CT2*c* may be "|(VGL+Vth)−VGL|", and a voltage Vbs between the bottom gate electrode and the source electrode of the second control transistor CT2*c* may be "|DVGL-VGL|". That is, Vbs may be greater than Vgs.

As illustrated in FIG. 14B, when the second control transistor CT2*c* is in the turn-off state, due to the bottom gate electrode BGE, the current-voltage curve Gh1 of the second control transistor CT2*c* may be shifted to a positive direction and may change to the current-voltage curve Gh2. Accordingly, when the second control transistor CT2*c* is in the turn-off state, a turn-off margin may increase, and thus, a stable turn-off state may be maintained.

Also, in the turn-on state of the second control transistor CT2*c*, the voltage Vgs between the gate electrode and the source electrode of the second control transistor CT2*c* may be "|VGH-VGL|", and the voltage Vbs between the bottom gate electrode and the source electrode of the second control transistor CT2*c* may also be "|VGH-VGL|".

As illustrated in FIG. 14B, when the second control transistor CT2*c* is in the turn-on state, due to the bottom gate electrode BGE, the current-voltage curve Gh1 of the second control transistor CT2*c* may be shifted to a negative direction and may change to the current-voltage curve Gh3. Accordingly, when the second control transistor CT2*c* is in the turn-on state, a turn-on margin may increase, and thus, a response characteristic of the second control transistor CT2*c* may be enhanced.

Referring to FIG. 13B, a first stage ST1*e*_1 includes the first and second output transistors OT1 and OT2, the first to fourth control transistors CT1, CT2*c*, CT3, and CT4, a fifth control transistor CT5, and the first and second capacitors C1 and C2.

The first stage ST1*e*_1 may further include a reset terminal ESR. The first stage ST1*e*_1 may receive a reset signal for resetting the third node Q2 through the reset terminal ESR.

The fifth control transistor CT5 is connected between the second voltage terminal VT2 and the third node Q2 and operates in response to the reset signal received through the reset terminal ESR. The fifth control transistor CT5 includes a first electrode connected to the second voltage terminal VT2, a second electrode connected to the third node Q2, and a third electrode connected to the reset terminal ESR. The reset signal may be applied to the reset terminal ESR in a boosting phase where the display device DD (refer to FIG. 1) is powered on and prepares an operation and does not be applied to the reset terminal ESR in a display phase where an image is actually displayed. Accordingly, the fifth control transistor CT5 may be turned on only in the boosting phase and may reset the third node Q2 of each of the stages ST1*e* to STn+1e (refer to FIG. 12); the fifth control transistor CT5 may be maintained in the turn-off state in the display phase.

The reset terminals ESR of the stages ST1*e* to STn+1e may be connected to each other. Accordingly, the third nodes Q2 of the stages ST1*e* to STn+1e may be simultaneously reset.

Figure 15:
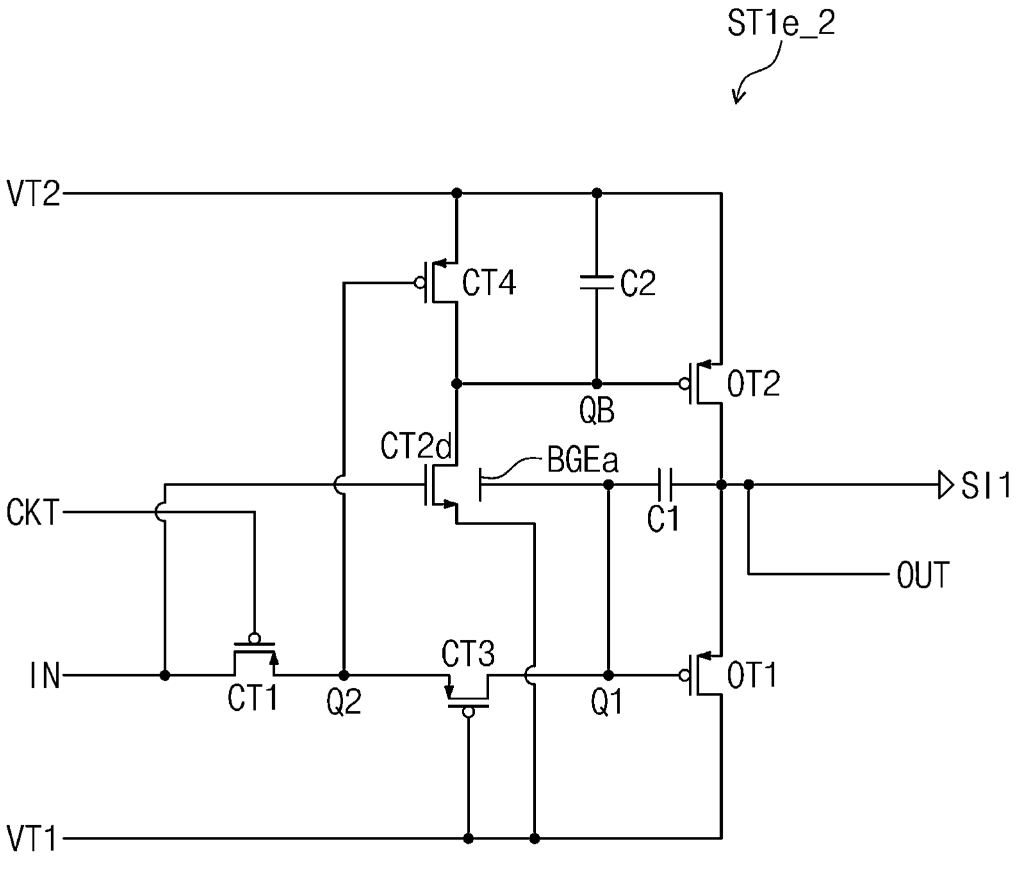
FIG. 15 is a circuit diagram of a first stage illustrated in FIG. 12.

FIG. 15 is a circuit diagram of a first stage illustrated in FIG. 12.

Referring to FIGS. 14A and 15, a first stage ST1*e*_2 includes the first and second output transistors OT1 and OT2, the first control transistor CT1, a second control transistor CT2*d*, the third control transistor CT3, the fourth control transistor CT4, and the first and second capacitors C1 and C2.

The second control transistor CT2*d* includes a first electrode connected to the second node QB, a second electrode connected to the first voltage terminal VT1, and a third electrode connected to the input terminal IN. The second control transistor CT2*d* further includes a bottom gate electrode BGEa connected to the first node Q1.

When the start signal FLMb transitions to the relatively low level, the second control transistor CT2*d* is turned off. Also, when the start signal FLMb transitions to the relatively low level, the potentials of the first and third nodes Q1 and Q2 may be maintained at the relatively low level from a period in which the first clock signal CLK is at the relatively low level (or from a point in time when the first clock signal CLK transitions from the relatively high level to the relatively low level). The first output transistor OT1 is turned on in response to the potential of the first node Q1 of the low state. The low voltage VGL may be output to the output terminal OUT through the first output transistor OT1 thus turned on.

When the low voltage VGL is output to the output terminal OUT, the potential of the first node Q1 may decrease to the down low-voltage DVGL lower than the low voltage VGL by the coupling of the first capacitor C1. Accordingly, when the potential of the first node Q1 decreases to the down low-voltage DVGL, an output characteristic of the first output transistor OT1 may be enhanced, and thus, the first initialization scan signal SI1 may have a stable low state.

Figure 16:
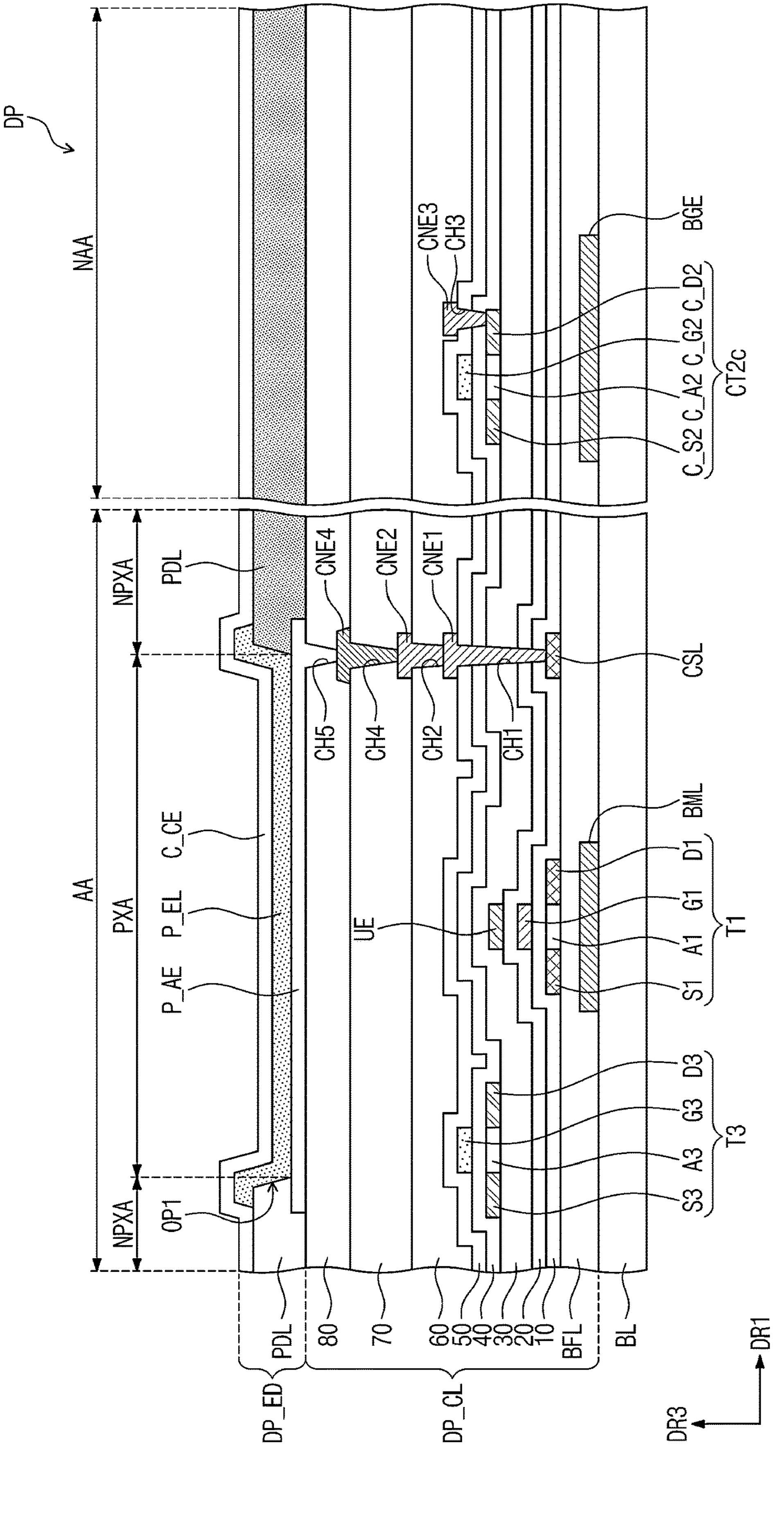
FIG. 16 is a cross-sectional view of an embodiment of a display panel according to the disclosure.

FIG. 16 is a cross-sectional view of a display panel according to the disclosure.

Referring to FIG. 16, the display panel DP may include a base layer BL, a circuit layer DP_CL, an element layer DP_ED.

The base layer BL may include a synthetic resin layer. The synthetic resin layer may include a thermosetting resin material. In particular, the synthetic resin layer may be a polyimide-based resin layer, and the material thereof is not particularly limited. The synthetic resin layer may include at least one of acrylic resin, methacrylic resin, polyisoprene, vinyl resin, epoxy resin, urethane resin, cellulose resin, siloxane resin, polyamide resin, and perylene resin. In addition, the base layer BL may include at least one of a glass substrate, a metal substrate, an organic/inorganic composite substrate, etc.

At least one inorganic layer is formed on an upper surface of the base layer BL. The inorganic layer may include at least one of aluminum oxide, titanium oxide, silicon oxide, silicon oxy nitride, zirconium oxide, and hafnium oxide. The inorganic layer may consist of multiple layers.

The circuit layer DP_CL is disposed on the base layer BL. Referring to FIG. 16, a shielding layer BML may be disposed on the base layer BL. The shielding layer BML may overlap the first transistor T1. The shielding layer BML may include a metal and may be supplied with a constant voltage. When the constant voltage is applied to the shielding layer BML, a value of the threshold voltage Vth of the first transistor T1 disposed on the shielding layer BML may be maintained without change.

Also, the shielding layer BML may block a light incident onto the first transistor T1 from below the shielding layer BML. In an embodiment, the shielding layer BML may include a reflective metal, for example. In an embodiment of the disclosure, the shielding layer BML may be omitted. A buffer layer BFL may be disposed on the base layer BL, and the buffer layer BFL may be an inorganic layer. The buffer layer BFL may cover the shielding layer BML.

A semiconductor pattern is disposed on the buffer layer BFL. Below, a semiconductor pattern directly disposed on the buffer layer BFL is defined as a first semiconductor pattern. The first semiconductor pattern may include a silicon semiconductor. The first semiconductor pattern may include poly silicon. However, the disclosure is not limited thereto. In an embodiment, the first semiconductor pattern may include amorphous silicon, for example.

FIG. 16 shows only a part of the first semiconductor pattern, and the first semiconductor pattern may be further disposed in any other area of the pixel PXij (refer to FIG. 2). An electrical property of the first semiconductor pattern varies depending on whether it is doped or not. The first semiconductor pattern may include a doped area and an undoped area. The doped area may be doped with the N-type dopant or the P-type dopant. A P-type transistor includes a doped area doped with the P-type dopant, and an N-type transistor includes a doped area doped with the N-type dopant.

The doped area has higher conductivity than that of the undoped area, and operates substantially as an electrode or a signal line. The undoped area corresponds substantially to the active (or channel) of a transistor. In other words, a portion of the first semiconductor pattern may be the active of the transistor, another portion thereof may be a source or drain of the transistor, and a remaining portion thereof may be a connection signal line (or connection electrode).

As illustrated in FIG. 16, a first electrode S1, a channel part A1, and a second electrode D1 of the first transistor T1 are formed from the first semiconductor pattern. The first electrode S1 and the second electrode D1 of the first transistor T1 extend in opposite directions from the channel part A1.

A portion of a connection signal line CSL formed from the semiconductor pattern is illustrated in FIG. 16. Although not illustrated separately, the connection signal line CSL may be electrically connected to the second electrode of the sixth transistor T6 (refer to FIG. 2) in a plan view.

A first insulating layer 10 is disposed on the buffer layer BFL. The first insulating layer 10 overlaps the plurality of pixels PX (refer to FIG. 1) in common and covers the first semiconductor pattern. The first insulating layer 10 may be an inorganic layer and/or an organic layer and may have a single-layer or multi-layer structure. The first insulating layer 10 may include at least one of an aluminum oxide, a titanium oxide, a silicon oxide, a silicon oxynitride, a zirconium oxide, and a hafnium oxide. In an embodiment, the first insulating layer 10 may be a single silicon oxide layer. In addition to the first insulating layer 10, an insulating layer of the circuit layer DP_CL to be described later may be an inorganic layer and/or an organic layer and may have a single-layer structure or a multi-layer structure. The inorganic layer may include at least one of the materials described above.

A third electrode G1 of the first transistor T1 is disposed on the first insulating layer 10. The third electrode G1 of the first transistor T1 overlaps the channel part A1 of the first transistor T1. In the process of doping the first semiconductor pattern, the third electrode G1 of the first transistor T1 may serve as a mask.

A second insulating layer 20 covering the third electrode G1 is disposed on the first insulating layer 10. The second insulating layer 20 overlaps the plurality of pixels PX in common. The second insulating layer 20 may be an inorganic layer and/or an organic layer and may have a single-layer or multi-layer structure. In an embodiment, the second insulating layer 20 may be a silicon oxide layer of a single-layer structure.

An upper electrode UE may be disposed on the second insulating layer 20. The upper electrode UE may overlap the third electrode G1. A portion of the third electrode G1 and the upper electrode UE overlapping the portion of the third electrode G1 may define the capacitor Cst (refer to FIG. 2). In an embodiment of the disclosure, the upper electrode UE may be omitted.

In an embodiment of the disclosure, the second insulating layer 20 may be replaced with an insulating pattern. The upper electrode UE is disposed on the insulating pattern. The upper electrode UE may serve as a mask for forming an insulating pattern from the second insulating layer 20.

A third insulating layer 30 covering the upper electrode UE is disposed on the second insulating layer 20. In an embodiment, the third insulating layer 30 may be a silicon oxide layer of a single layer structure. A semiconductor pattern is disposed on the third insulating layer 30. Below, the semiconductor pattern directly disposed on the third insulating layer 30 is defined as a second semiconductor pattern. The second semiconductor pattern may include a metal oxide. The oxide semiconductor may include a crystalline or amorphous oxide semiconductor. In an embodiment, the oxide semiconductor may include a combination of oxides of at least one of metals, such as zinc (Zn), indium (In), gallium (Ga), tin (Sn), and titanium (Ti), for example. The oxide semiconductors may include at least one of an indium-tin oxide ("ITO"), an indium-gallium-zinc oxide ("IGZO"), a zinc oxide (ZnO), an indium-zinc oxide ("IZO"), a zinc-indium oxide (ZIO), an indium oxide (InO), a titanium oxide (TiO), an indium-zinc-tin oxide ("IZTO"), a zinc-tin oxide ("ZTO"), etc.

FIG. 16 shows only a part of the second semiconductor pattern, and the second semiconductor pattern may be further disposed in any other area of the pixel PXij. The second semiconductor pattern may include a plurality of areas that are distinguished depending on whether the metal oxide is reduced. An area (hereinafter also referred to as a "reduction area") in which the metal oxide is reduced has higher conductivity than an area (hereinafter also referred to as a "non-reduction area") in which the metal oxide is not reduced. The reduction area substantially has the role of an electrode or signal line. The non-reduction area substantially corresponds to a channel part A3 of the third transistor T3. In other words, a portion of the second semiconductor pattern may be the channel part A3 of the third transistor T3, and a remaining portion thereof may be a first electrode S3 or a second electrode D3 of the third transistor T3.

The circuit layer DP_CL may further include a portion of a semiconductor pattern disposed on the non-effective area NAA. For convenience of description, there is illustrated the second control transistor CT2*c* of the semiconductor pattern of the scan driver, which is disposed in the non-effective area NAA. A first electrode C_S2, a channel part C_A2, and a second electrode C_D2 of the second control transistor CT2*c* are formed from the second semiconductor pattern. In an embodiment of the disclosure, the second semiconductor pattern may include a metal oxide. The first electrode C_S2 and the second electrode C_D2 include a metal reduced from a metal oxide semiconductor. The first electrode C_S2 and the second electrode C_D2 may include a metal layer that has a given thickness from an upper surface of the second semiconductor pattern and includes the reduced metal.

A fourth insulating layer 40 is disposed to cover the first electrode S3, the channel part A3, and the second electrode D3 of the third transistor T3 and the first electrode C_S2, the channel part C_A2, and the second electrode C_D2 of the second control transistor CT2*c*. A third electrode G3 of the third transistor T3 and a third electrode C_G2 of the second control transistor CT2*c* are disposed on the fourth insulating layer 40. The third electrode G3 of the third transistor T3 overlaps the channel part A3 of the third transistor T3, and the third electrode C_G2 of the second control transistor CT2*c* overlaps the channel part C_A2 of the second control transistor CT2*c*.

In an embodiment of the disclosure, the bottom gate electrode BGE and the shielding layer BML of the second control transistor CT2*c* may be disposed on the same layer (i.e., the base layer BL). However, the disclosure is not limited thereto. In an alternative embodiment, the bottom gate electrode BGE of the second control transistor CT2*c* and the upper electrode UE may be disposed on the same layer (i.e., the second insulating layer 20). The bottom gate electrode BGE may be connected to the second electrode of the third control transistor CT3 or the third electrode of the first output transistor OT1, which is connected to the first node Q1, as illustrated in FIGS. 13A and 13B.

A fifth insulating layer 50 that covers the third electrode G3 of the third transistor T3 and the third electrode C_G2 of the second control transistor CT2*c* is disposed on the fourth insulating layer 40. In this embodiment, the fifth insulating layer 50 may include at least one of a silicon oxide layer and a silicon nitride layer. The fifth insulating layer 50 may include a plurality of silicon oxide layers and a plurality of silicon nitride layers, which are alternately stacked.

At least one insulating layer is further disposed on the fifth insulating layer 50. Like this embodiment, a sixth insulating layer 60 and a seventh insulating layer 70 may be disposed on the fifth insulating layer 50. The sixth insulating layer 60 and the seventh insulating layer 70 may be organic layers and may have a single-layer structure or a multi-layer structure. Each of the sixth insulating layer 60 and the seventh insulating layer 70 may be a polyimide-based resin layer of a single layer structure. However, the disclosure is not limited thereto. In an embodiment, the sixth insulating layer 60 and the seventh insulating layer 70 may include at least one of acrylic resin, methacrylic resin, polyisoprene, vinyl resin, epoxy resin, urethane-based resin, cellulosic resin, siloxane-based resin, polyamide resin, and perylene-based resin, for example.

A first connection electrode CNE1 may be disposed on the fifth insulating layer 50. The first connection electrode CNE1 is connected to the connection signal line CSL through a first contact hole CH1 penetrating the first to fifth insulating layers 10, 20, 30, 40, and 50. A second connection electrode CNE2 may be connected to the first connection electrode CNE1 through a second contact hole CH2 penetrating the sixth insulating layer 60. In an embodiment of the disclosure, at least one of the fifth insulating layer 50 to the seventh insulating layer 70 may be omitted, and one of the first and second connection electrodes CNE1 and CNE2 may be omitted.

A third connection electrode CNE3 may be further disposed on the fifth insulating layer 50. The third connection electrode CNE3 is connected to the second electrode CT_D2 of the second control transistor CT2*c* through a third contact hole CH3 penetrating the fourth and fifth insulating layers 40 and 50.

A fourth connection electrode CNE4 may be further disposed on the seventh insulating layer 70. The fourth connection electrode CNE4 may be connected to the second connection electrode CNE2 through a fourth contact hole CH4 penetrating the seventh insulating layer 70. The fourth connection electrode CNE4 is covered by an eighth insulating layer 80.

The element layer DP_ED is disposed on the circuit layer DP_CL. The element layer DP_ED may include the light-emitting element ED (refer to FIG. 2). As illustrated in FIG. 16, an anode electrode P_AE of the light-emitting element ED may be connected to the fourth connection electrode CNE4 through a fifth contact hole CH5 penetrating the eighth insulating layer 80.

A structure in which the circuit layer DP_CL includes the fourth connection electrode CNE4 is illustrated in FIG. 16, but the disclosure is not limited thereto. In an alternative embodiment, the fourth connection electrode CNE4 may be omitted in the circuit layer DP_CL. In this case, the anode electrode P_AE may be directly connected to the second connection electrode CNE2.

The element layer DP_ED further include a pixel defining layer PDL disposed on the circuit layer DP_CL. A pixel opening OP1 corresponding to the light-emitting element ED may be defined in the pixel defining layer PDL. The pixel opening OP1 exposes at least a portion of the anode electrode P_AE of the light-emitting element ED. The pixel opening OP1 of the pixel defining layer PDL may define an emission area PXA. In an embodiment, the plurality of pixels PX (refer to FIG. 3) may be disposed in a plan view of the display panel DP (refer to FIG. 3) in compliance with a given rule, for example. An area in which the plurality of pixels PX is arranged may be defined as a pixel area, and one pixel area may include the emission area PXA and a non-emission area NPXA adjacent to the emission area PXA. The non-emission area NPXA may surround the emission area PXA.

An emission layer P_EL is disposed to correspond to the pixel opening OP1 defined in the pixel defining layer PDL. In an embodiment, the patterned emission layer P_EL is illustrated in an embodiment, but the disclosure is not limited thereto. A common emission layer may be disposed in common in the plurality of pixels PX. In this case, the common emission layer may generate a white light or a blue light. A cathode electrode C_CE may face the anode electrode P_AE. The cathode electrode C_CE is disposed in common in the plurality of pixels PX.

Figure 17:
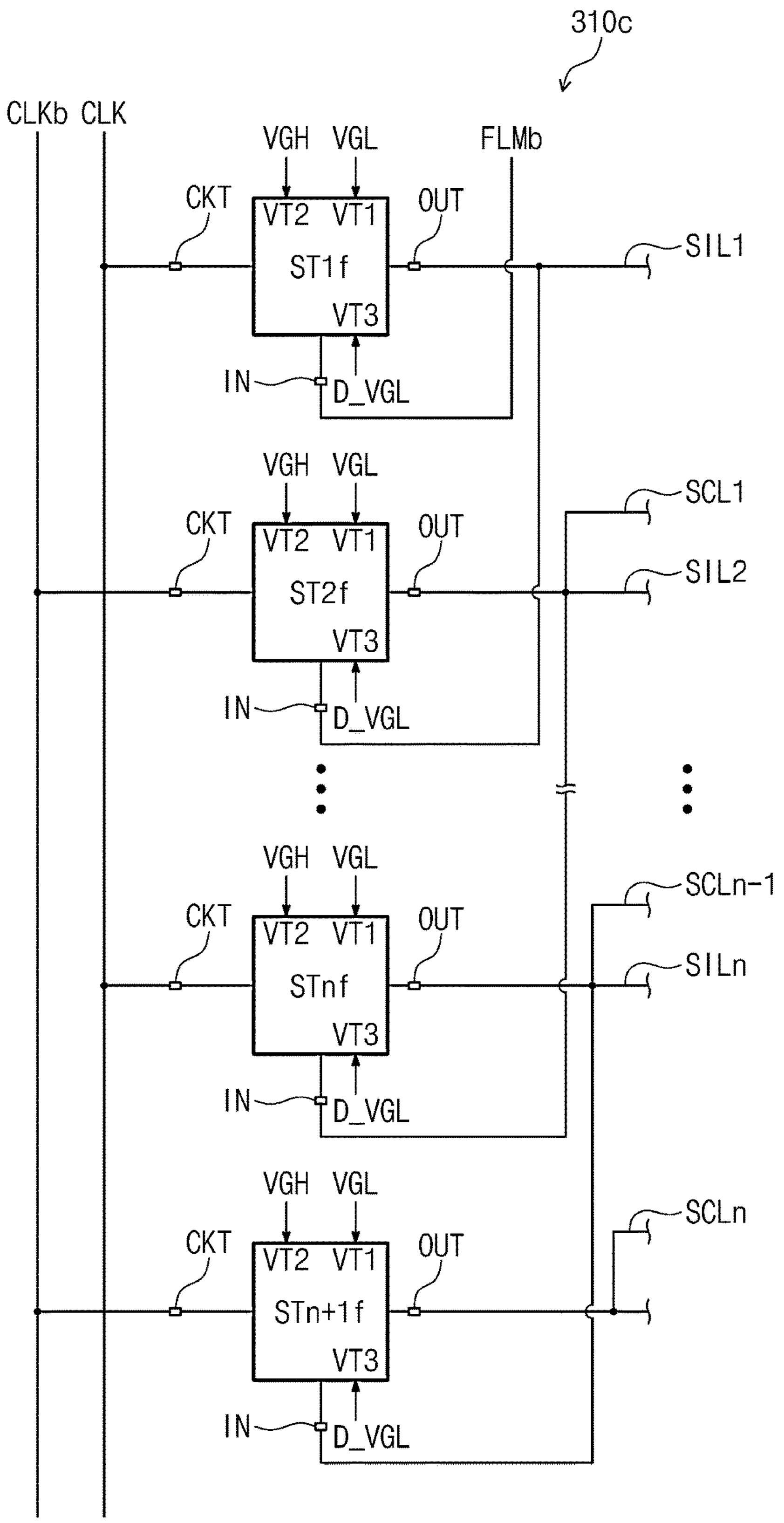
FIG. 17 is a block diagram of a first scan driving circuit illustrated in FIG. 4A.
Figure 18:
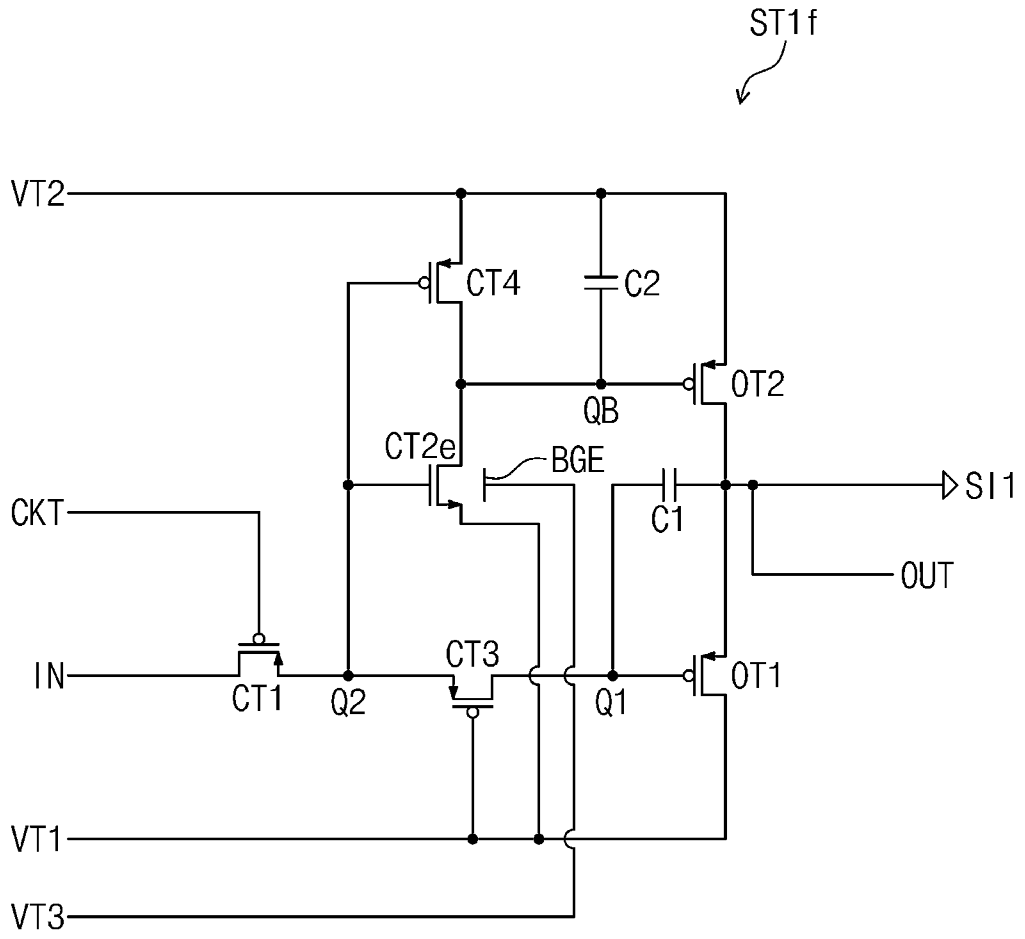
FIG. 18 is a circuit diagram of a first stage illustrated in FIG. 17.

FIG. 17 is a block diagram of a first scan driving circuit illustrated in FIG. 4A, and FIG. 18 is a circuit diagram of a first stage illustrated in FIG. 17. Components, which are the same as the components illustrated in FIGS. 12 and 13, from among components illustrated in FIGS. 17 and 18 are marked by the same reference signs, and thus, additional description will be omitted to avoid redundancy.

Referring to FIG. 17, a first scan driving circuit 310*c* may include a plurality of stages ST1*f* to STn+1f that are sequentially connected to each other. The stages ST1*f* to STn+1f may have substantially the same circuit configuration as each other. For convenience of description, four stages ST1*f*, ST2*f*, STnf, and STn+1f are illustrated in FIG. 17 as one of embodiments.

Each of the stages ST1*f* to STn+1f may include the input terminal IN, the clock terminal CKT, the first and second voltage terminals VT1 and VT2, a dummy voltage terminal VT3, and the output terminal OUT.

The first voltage terminal VT1 may be a terminal to which the low voltage VGL (or the first voltage) is supplied, and the second voltage terminal VT2 may be a terminal to which the high voltage VGH (or the second voltage) is supplied. The low voltage VGL and the high voltage VGH may have a DC voltage level. The high voltage VGH may be used as the relatively high level of the scan signal, that is, the gate on voltage, and the low voltage VGL may be used as the relatively low level of the scan signal, that is, the gate off voltage. The voltage level of the low voltage VGL may be lower than the voltage level of the high voltage VGH.

The dummy voltage terminal VT3 may refer to a terminal to which a dummy low voltage D_VGL (or a third voltage) whose voltage level is lower than that of the low voltage VGL is supplied. The dummy low voltage D_VGL may have a DC voltage level.

The first voltage terminals VT1 of the stages ST1*f* to STn+1f may be connected to each other, and the second voltage terminals VT2 of the stages ST1*f* to STn+1f may be connected to each other. The dummy voltage terminals VT3 of the stages ST1*f* to STn+1f may be connected to each other.

Below, a circuit configuration of the first stage ST1*f* among the stages ST1*f* to STn+1f will be described with reference to FIG. 18. Because the stages ST1*f* to STn+1f have the same circuit configuration as each other, additional description associated with the circuit configuration of the remaining stages ST2*f* to STn+1f will be omitted to avoid redundancy.

Referring to FIG. 18, the first stage ST1*f* includes the first and second output transistors OT1 and OT2, the first control transistor CT1, a second control transistor CT2*e*, the third control transistor CT3, the fourth control transistor CT4, and the first and second capacitors C1 and C2.

The second control transistor CT2*e* is connected between the second node QB and the first voltage terminal VT1 and operates in response to the potential of the third node Q2. The second control transistor CT2*e* includes a first electrode connected to the second node QB, a second electrode connected to the first voltage terminal VT1, and a third electrode connected to the third node Q2. The second control transistor CT2*e* further includes the bottom gate electrode BGE connected to the dummy voltage terminal VT3. The third electrode of the second control transistor CT2*e* and the third electrode of the fourth control transistor CT4 may be connected in common to the third node Q2.

In an embodiment of the disclosure, the fourth control transistor CT4 may include an LTPS semiconductor layer and may be implemented with the first-type (or P-type) transistor. The second control transistor CT2*e* may include an oxide semiconductor layer and may be implemented with the second-type (or N-type) transistor. Accordingly, the second control transistor CT2*e* and the fourth control transistor CT4 may be alternately turned on in response to the potential of the third node Q2.

The bottom gate electrode BGE of the second control transistor CT2*e* may receive the dummy low voltage D_VGL through the dummy voltage terminal VT3. When the second control transistor CT2*e* is in the turn-off state, the third electrode of the second control transistor CT2*e* may have the low voltage VGL, but the bottom gate electrode BGE may have the dummy low voltage D_VGL lower than the low voltage VGL. Accordingly, when the second control transistor CT2*c* is in the turn-off state, a voltage Vgs between the gate electrode and the source electrode of the second control transistor CT2*c* may be "|(VGL+Vth)−VGL|", and a voltage Vbs between the bottom gate electrode and the source electrode of the second control transistor CT2*c* may be "|D_VGL−VGL|". That is, Vbs may be greater than Vgs.

As such, as illustrated in FIG. 14B, when the second control transistor CT2*e* is in the turn-off state, due to the bottom gate electrode BGE, the current-voltage curve Gh1 of the second control transistor CT2*c* may be shifted to a positive direction and may change to the current-voltage curve Gh2. Accordingly, when the second control transistor CT2*e* is in the turn-off state, a turn-off margin may increase, and thus, a stable turn-off state may be maintained.

Figure 19:
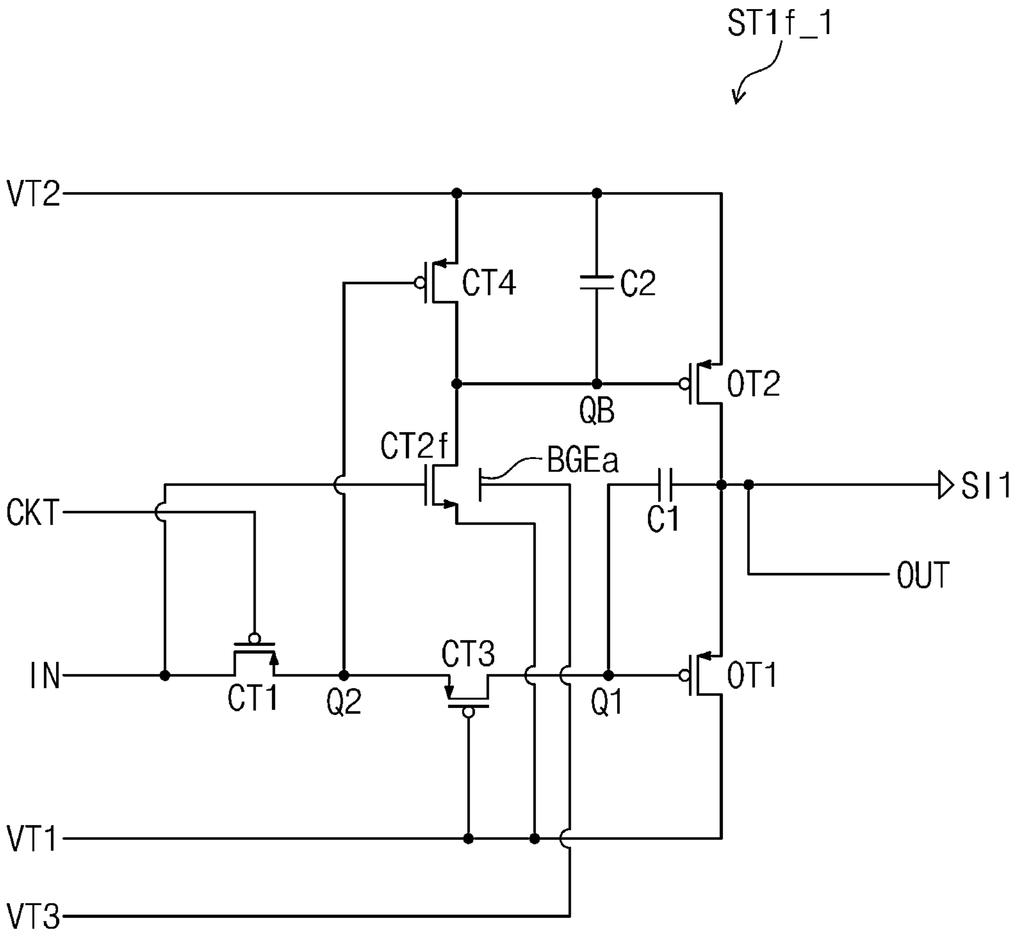
FIG. 19 is a circuit diagram of a first stage illustrated in FIG. 17.

FIG. 19 is a circuit diagram of a first stage illustrated in FIG. 17.

Referring to FIG. 19, a first stage ST1*f*_1 includes the first and second output transistors OT1 and OT2, the first control transistor CT1, a second control transistor CT2*f*, the third control transistor CT3, the fourth control transistor CT4, and the first and second capacitors C1 and C2.

The second control transistor CT2*f* includes a first electrode connected to the second node QB, a second electrode connected to the first voltage terminal VT1, and a third electrode connected to the input terminal IN. The second control transistor CT2*f* further includes a bottom gate electrode BGEa connected to the dummy voltage terminal VT3.

The bottom gate electrode BGEa of the second control transistor CT2*f* may receive the dummy low voltage D_VGL through the dummy voltage terminal VT3. When the second control transistor CT2*f* is in the turn-off state, the third electrode of the second control transistor CT2*f* may have the low voltage VGL, but the bottom gate electrode BGEa may have the dummy low voltage D_VGL lower than the low voltage VGL. Accordingly, when the second control transistor CT2*f* is in the turn-off state, a turn-off margin may increase due to the bottom gate electrode BGEa, and thus, a stable turn-off state may be maintained.

According to the disclosure, each stage of a scan driver includes a P-type control transistor and an N-type control transistor. Accordingly, a circuit configuration of each stage may be simplified, and thus, the width of a non-effective area of a display device may be prevented from increasing. Also, as the number of signals input to each stage decreases, the power consumption of a display device may be reduced.

While the disclosure has been described with reference to embodiments thereof, it will be apparent to those of ordinary skill in the art that various changes and modifications may be made thereto without departing from the spirit and scope of the disclosure as set forth in the following claims.

What is claimed is:

1. A scan driver comprising:
- a plurality of stages sequentially connected to each other, each of the plurality of stages including:
  - a first output transistor which is connected between an output terminal and a first voltage terminal, and operates in response to a potential of a first node;
  - a second output transistor which is connected between the output terminal and a second voltage terminal, and operates in response to a potential of a second node;
  - a first control transistor which is connected between an input terminal which receives a start signal or a previous carry signal from a previous stage and a third node, and operates in response to a clock signal provided through a clock terminal;
  - a second control transistor which is connected between the second node and the first voltage terminal, and operates in response to a potential of the third node, the second control transistor including:
    - a first electrode connected to the second node;
    - a second electrode connected to the first voltage terminal;
    - a top gate electrode directly connected to the third node; and
  - a bottom gate electrode directly connected to the first node without going through a capacitor,
  - a third control transistor which is connected between the top gate electrode and the bottom gate electrode, and operates in response to a first voltage provided through the first voltage terminal; and
  - a fourth control transistor which is connected between the second node and the second voltage terminal, and operates in response to the potential of the third node,
- wherein each of the first and second output transistors and the first, third, and fourth control transistors is a first type,
- wherein the second control transistor is a second type different from the first type.

2. The scan driver of claim 1, wherein each of the plurality of stages further comprises:
- a first capacitor connected between the output terminal and the first node; and
- a second capacitor connected between the second node and the second voltage terminal.

3. The scan driver of claim 1, wherein the first type is a P-type, and the second type is an N-type.

4. The scan driver of claim 3, wherein the second control transistor includes an oxide semiconductor layer, and
- wherein each of the first and second output transistors and the first, third, and fourth control transistors includes a low-temperature polycrystalline silicon semiconductor layer.

5. The scan driver of claim 1, wherein a voltage level of the first voltage applied to the first voltage terminal is lower than a voltage level of a second voltage applied to the second voltage terminal.

6. A scan driver comprising:
- a plurality of stages sequentially connected to each other, each of the plurality of stages including:
  - a first output transistor including:
    - a first electrode connected to an output terminal;
    - a second electrode connected to a first voltage terminal; and
    - a third electrode connected to a first node;
  - a first capacitor connected between the output terminal and the first node;
  - a second output transistor including:
    - a first electrode connected to the output terminal;

a second electrode connected to a second voltage terminal; and a third electrode connected to a second node;

a first control transistor including:

a first electrode connected to an input terminal;

a second electrode connected to a third node; and a third electrode connected to a clock terminal;

a second control transistor including:

a first electrode connected to the second node;

a second electrode connected to the first voltage terminal;

a top gate electrode directly connected to the third node; and a bottom gate electrode facing the top gate electrode and directly connected to the first node without going through a capacitor;

a third control transistor including:

a first electrode connected to the top gate electrode;

a second electrode connected to the bottom gate electrode; and a third electrode connected to the first voltage terminal; and a fourth control transistor including:

a first electrode connected to the second node;

a second electrode connected to the second voltage terminal; and a third electrode connected to the third node.

7. The scan driver of claim 6, wherein each of the plurality of stages further includes:

a second capacitor connected between the second node and the second voltage terminal.

8. The scan driver of claim 6, wherien each of the first and second output transitors and the first, third, and fourth control transistors is a P-type, and wherein the second control transistor is an N-type.

9. The scan driver of claim 8, wherein the second control transistor includes an oxide semiconductor layer, and whereien each of the first and second output transistors and the first, third, and fourth control transistors includes a low-temperature polycrystalline silicon semiconductor layer.

10. A display device comprising:

a display panel including a plurality of pixels;

a data driver which outputs data signals to the display panel; and a scan driver which outputs scan signals to the display panel, the scan driver including:

a plurality of stages sequentially connected to each other, each of the plurality of stages including:

a first output transistor including:

a first electrode connected to an output terminal;

a second electrode connected to a first voltage terminal; and a third electrode connected to a first node;

a second output transistor including:

a first electrode connected to the output terminal;

a second electrode connected to a second voltage terminal; and a third electrode connected to a second node;

a first control transistor including:

a first electrode connected to an input terminal;

a second electrode connected to a third node; and a third electrode connected to a clock terminal;

a second control transistor including:

a first electrode connected to the second node;

a second electrode connected to the first voltage terminal;

a top gate electrode directly connected to the third node; and a bottom gate electrode directly connected to the first node without going through a capacitor, a third control transistor including:

a first electrode connected to the top gate electrode;

a second electrode connected to the bottom gate electrode; and a third electrode connected to the first voltage terminal; and a fourth control transistor including:

a first electrode connected to the second node;

a second electrode connected to the second voltage terminal; and a third electrode connected to the third node, wherein each of the first and second output transistors and the first, third, and fourth control transistors is a P-type, and wherein the second control transistor is an N-type.

* * * * *